(12) United States Patent
Yonebayashi

(10) Patent No.: US 8,510,790 B2
(45) Date of Patent: Aug. 13, 2013

(54) SUBSTRATE PROCESSING APPARATUS

(75) Inventor: Toru Yonebayashi, Toyama (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1426 days.

(21) Appl. No.: 12/073,787

(22) Filed: Mar. 10, 2008

(65) Prior Publication Data

US 2008/0229386 A1    Sep. 18, 2008

(30) Foreign Application Priority Data

Mar. 12, 2007 (JP) .................................. 2007-61745
Feb. 8, 2008 (JP) .................................. 2008-29049

(51) Int. Cl.
H04L 29/06 (2006.01)

(52) U.S. Cl.
USPC ................................................ 726/1; 726/17

(58) Field of Classification Search
USPC ....................................................... 726/1, 17
See application file for complete search history.

(56) References Cited

U.S. PATENT DOCUMENTS

| | | | |
|---|---|---|---|
| 5,048,085 A * | 9/1991 | Abraham et al. ............. 713/159 |
| 5,206,929 A * | 4/1993 | Langford et al. ............. 715/723 |
| 5,218,672 A * | 6/1993 | Morgan et al. ................ 345/501 |
| 5,819,092 A * | 10/1998 | Ferguson et al. ............. 717/113 |
| 5,864,875 A * | 1/1999 | Van Huben et al. .................. 1/1 |
| 6,122,556 A | 9/2000 | Tochiori et al. |
| 6,415,193 B1 * | 7/2002 | Betawar et al. ................ 700/97 |
| 6,478,230 B1 * | 11/2002 | Deutschmann ............... 235/492 |
| 6,629,003 B1 * | 9/2003 | Frizzell et al. .................. 700/97 |
| 6,665,575 B2 * | 12/2003 | Betawar et al. ............... 700/121 |
| 6,703,953 B2 * | 3/2004 | Maeda et al. .................. 341/144 |
| 6,717,517 B2 * | 4/2004 | Przygoda, Jr. ............. 340/572.4 |
| 6,735,493 B1 * | 5/2004 | Chou et al. .................... 700/121 |
| 6,748,288 B2 * | 6/2004 | Su et al. ......................... 700/108 |

(Continued)

FOREIGN PATENT DOCUMENTS

| | | |
|---|---|---|
| JP | A 2003-366202 | 12/2002 |
| JP | A 2003-186843 | 7/2003 |

(Continued)

OTHER PUBLICATIONS

Korean Office Action issued in Korean Patent Application No. 10-2008-0022599 on Sep. 29, 2010 (with translation).

(Continued)

Primary Examiner — David García Cervetti
(74) Attorney, Agent, or Firm — Oliff & Berridge, PLC

(57) ABSTRACT

The object of the present invention is to provide a substrate processing apparatus and a substrate processing system capable of performing an appropriate processing in response to the operating condition of the substrate processing apparatus and of realizing an improvement in the availability rate of the apparatus. The substrate processing apparatus includes: storage section for storing a plurality of recipes describing a procedure for processing a substrate and operating authorities of a user corresponding to the plurality of recipes; and display section for displaying an authority setting screen for setting the operating authorities of the user to the respective recipes and an edition screen for editing a recipe stored in the storage section on the basis of the operating authority set via the authority setting screen. The substrate processing apparatus can edit the authority setting screen displayed by the display section and can set different operating authorities to the recipe between when the operating condition of the substrate processing apparatus is online and when the operating condition of the substrate processing apparatus is offline.

16 Claims, 13 Drawing Sheets

(56) References Cited

U.S. PATENT DOCUMENTS

| | | | |
|---|---|---|---|
| 6,842,510 B2 * | 1/2005 | Sakamoto | 379/102.01 |
| 6,970,763 B2 * | 11/2005 | Kato | 700/180 |
| 7,100,196 B2 * | 8/2006 | Fredriksson | 726/3 |
| 7,225,039 B2 * | 5/2007 | Chung et al. | 700/96 |
| 7,240,309 B2 * | 7/2007 | Saito et al. | 716/115 |
| 7,248,936 B1 * | 7/2007 | Holmes et al. | 700/97 |
| 7,260,443 B2 * | 8/2007 | Morinaga et al. | 700/121 |
| 7,299,102 B2 * | 11/2007 | Ouchi | 700/105 |
| 7,369,913 B2 * | 5/2008 | Heminway et al. | 700/100 |
| 7,568,000 B2 * | 7/2009 | Keyes et al. | 709/200 |
| 7,584,078 B2 * | 9/2009 | Junghans et al. | 703/1 |
| 7,630,777 B2 * | 12/2009 | Rudnick et al. | 700/23 |
| 7,698,480 B2 * | 4/2010 | Bychkov et al. | 710/36 |
| 7,779,387 B2 * | 8/2010 | Harry et al. | 717/113 |
| 7,818,574 B2 * | 10/2010 | Fayad et al. | 713/175 |
| 7,930,757 B2 * | 4/2011 | Shapiro et al. | 726/27 |
| 8,032,761 B2 * | 10/2011 | Rodgers et al. | 713/189 |
| 8,082,045 B1 * | 12/2011 | Ashizawa et al. | 700/17 |
| 8,271,119 B2 * | 9/2012 | Nakagawa | 700/117 |
| 2002/0089423 A1 * | 7/2002 | Przygoda, Jr. | 340/540 |
| 2003/0041135 A1 * | 2/2003 | Keyes et al. | 709/223 |
| 2003/0097563 A1 * | 5/2003 | Moroney et al. | 713/170 |
| 2003/0160715 A1 * | 8/2003 | Maeda et al. | 341/144 |
| 2005/0005093 A1 * | 1/2005 | Bartels et al. | 713/150 |
| 2005/0012612 A1 * | 1/2005 | Przygoda, Jr. | 340/539.13 |
| 2005/0055337 A1 * | 3/2005 | Bebo et al. | 707/3 |
| 2005/0223001 A1 * | 10/2005 | Kester et al. | 707/6 |
| 2005/0235012 A1 * | 10/2005 | Harry et al. | 707/203 |
| 2005/0262226 A1 * | 11/2005 | Holloway et al. | 709/221 |
| 2006/0004636 A1 * | 1/2006 | Kester et al. | 705/22 |
| 2006/0041655 A1 * | 2/2006 | Holloway et al. | 709/223 |
| 2007/0162957 A1 * | 7/2007 | Bartels | 726/2 |
| 2007/0198462 A1 * | 8/2007 | Ohta et al. | 707/1 |
| 2008/0178119 A1 * | 7/2008 | Nogami et al. | 715/810 |
| 2008/0294899 A1 * | 11/2008 | Gazzetta et al. | 713/170 |
| 2009/0158156 A1 * | 6/2009 | Vaidya et al. | 715/719 |
| 2009/0235865 A1 * | 9/2009 | Nakagawa | 118/696 |
| 2009/0292374 A1 * | 11/2009 | Iwakura | 700/79 |
| 2010/0002879 A1 * | 1/2010 | Risley | 380/255 |
| 2010/0205535 A1 * | 8/2010 | Mitamura et al. | 715/735 |

FOREIGN PATENT DOCUMENTS

| | | |
|---|---|---|
| JP | A 2003-323410 | 11/2003 |
| JP | A-2005-021573 | 1/2005 |
| JP | A-2006-60157 | 3/2006 |
| KR | 0372955 | 5/2003 |

OTHER PUBLICATIONS

Korean Office Action issued in Korean Application No. 10-2008-0022599 dated May 14, 2011 (w/ Translation).

Feb. 19, 2013 Office Action issued in Japanese Application No. 2008-029049 (with translation).

* cited by examiner

DISPLAY CONTROL PROCESSING
BASED ON AUTHORITY S10

SUBSTRATE PROCESSING APPARATUS

BACKGROUND OF THE INVENTION

1. Field of the Invention

The present invention relates to a substrate processing apparatus for processing a semiconductor wafer and a glass substrate.

2. Description of the Related Art

A substrate processing apparatus of this kind handles plural files. For example, a process recipe is a file that describes a detailed procedure for processing a substrate. While the substrate processing apparatus is in operation, the substrate processing apparatus processes a substrate on the basis of a procedure described by a specified recipe.

Generally, in the substrate processing apparatus, the operating authority of a user is controlled by a user's name and a password corresponding to the user both of which are inputted when the user performs the operation. On the other hand, the users (operators) operating the substrate processing apparatus include a person taking charge of a line, a maintenance engineer, and the like, and the contents of operation are different according to the operating condition of the substrate processing apparatus. For example, the person taking charge of a line operates the substrate processing apparatus when the operating condition of the substrate processing apparatus is online, whereas the maintenance engineer operates the substrate processing apparatus when the operating condition of the substrate processing apparatus is offline. In this manner, generally, in a semiconductor manufacturing factory, a distinction is made between an engineer (person taking charge of a line) operating the substrate processing apparatus when the operating condition of the substrate processing apparatus is online and an engineer (maintenance engineer, process engineer) operating the substrate processing apparatus when the operating condition of the substrate processing apparatus is offline.

However, in the related art described above, it is impossible to set the operating authority according to the operating condition of the substrate processing apparatus.

SUMMARY OF THE INVENTION

The object of the present invention is to solve the problem in the related art and to provide a substrate processing apparatus and a substrate processing system capable of performing an appropriate processing according to the operating condition of the substrate processing apparatus and by extension capable of realizing an improvement in the availability rate of the apparatus.

The feature of the present invention consists in a substrate processing apparatus including: storage section for storing various files including a plurality of recipes describing a procedure for processing a substrate and operating authorities of a user corresponding to the plurality of recipes; and display section for displaying an authority setting screen for setting the operating authorities of the user to the respective recipes and an edition screen for editing a recipe stored in the storage section respectively when an operating condition of the substrate processing apparatus is online or when an operating condition of the substrate processing apparatus is offline.

According to the present invention, the operating authorities of the operator are set to the respective recipes respectively when the operating condition of the substrate processing apparatus is online or when the operating condition of the substrate processing apparatus is offline, so that an appropriate processing can be performed according to the operating condition of the substrate processing apparatus. For example, when a trouble occurs, an operating authority is not given to a person in charge of a line but is given to a maintenance engineer. With this, the maintenance engineer can perform processing according to the contents of the trouble. Thus, it is possible to shorten the time spent for solving the trouble and hence to realize an improvement in the productivity of the substrate processing apparatus.

DETAILED DESCRIPTION OF THE PREFERRED EMBODIMENTS

Figure 1:
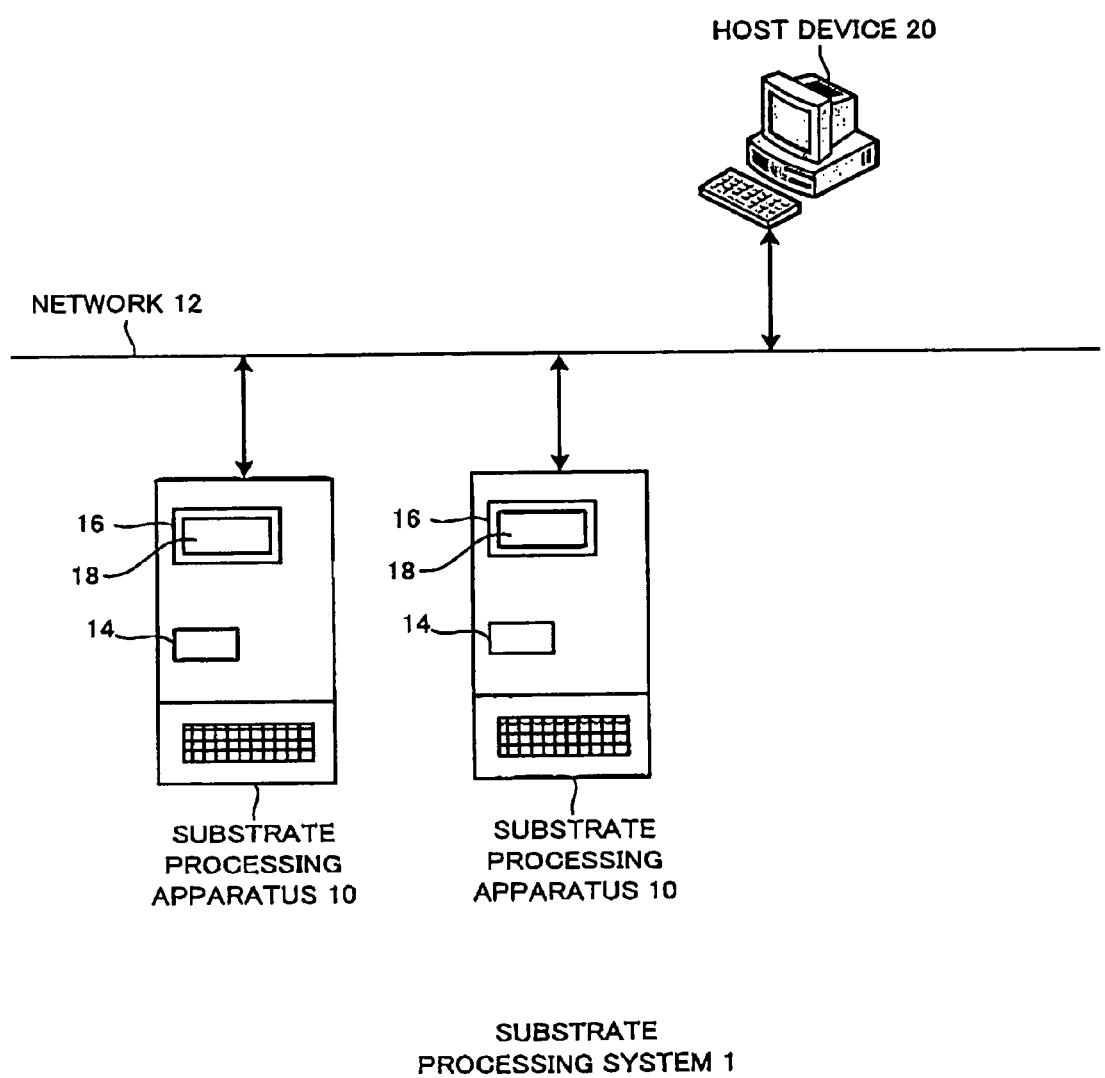
FIG. 1 is a diagram showing the configuration of a substrate processing system including a substrate processing apparatus according to an embodiment of the present invention.

FIG. 1 is a diagram showing the configuration of a substrate processing system 1 including a substrate processing apparatus 10 according to an embodiment of the present invention.

As shown in FIG. 1, the substrate processing system 1 includes the substrate processing apparatus 10 and a host device 20. The substrate processing apparatus 10 and the host device 20 are connected to each other through a network 12 such as a LAN. Thus, an instruction from the host device 20 is transmitted to the substrate processing apparatus 10 through the network 12. Here, the substrate processing system 1 may include plural substrate processing apparatuses 10.

In the substrate processing apparatus 10, an input/output device 16 is integrated with the substrate processing apparatus 10 or is disposed through the network 12 and has an operation display screen 18. On the operation display screen 18 are displayed an input screen to which specified data is inputted by a user (operator) and a display screen showing the condition of the substrate processing apparatus 10. Further, the substrate processing apparatus 10 has a process-oriented controller 14 disposed therein and devices disposed in the substrate processing apparatus 10 are controlled by the process-oriented controller 14.

Figure 2:
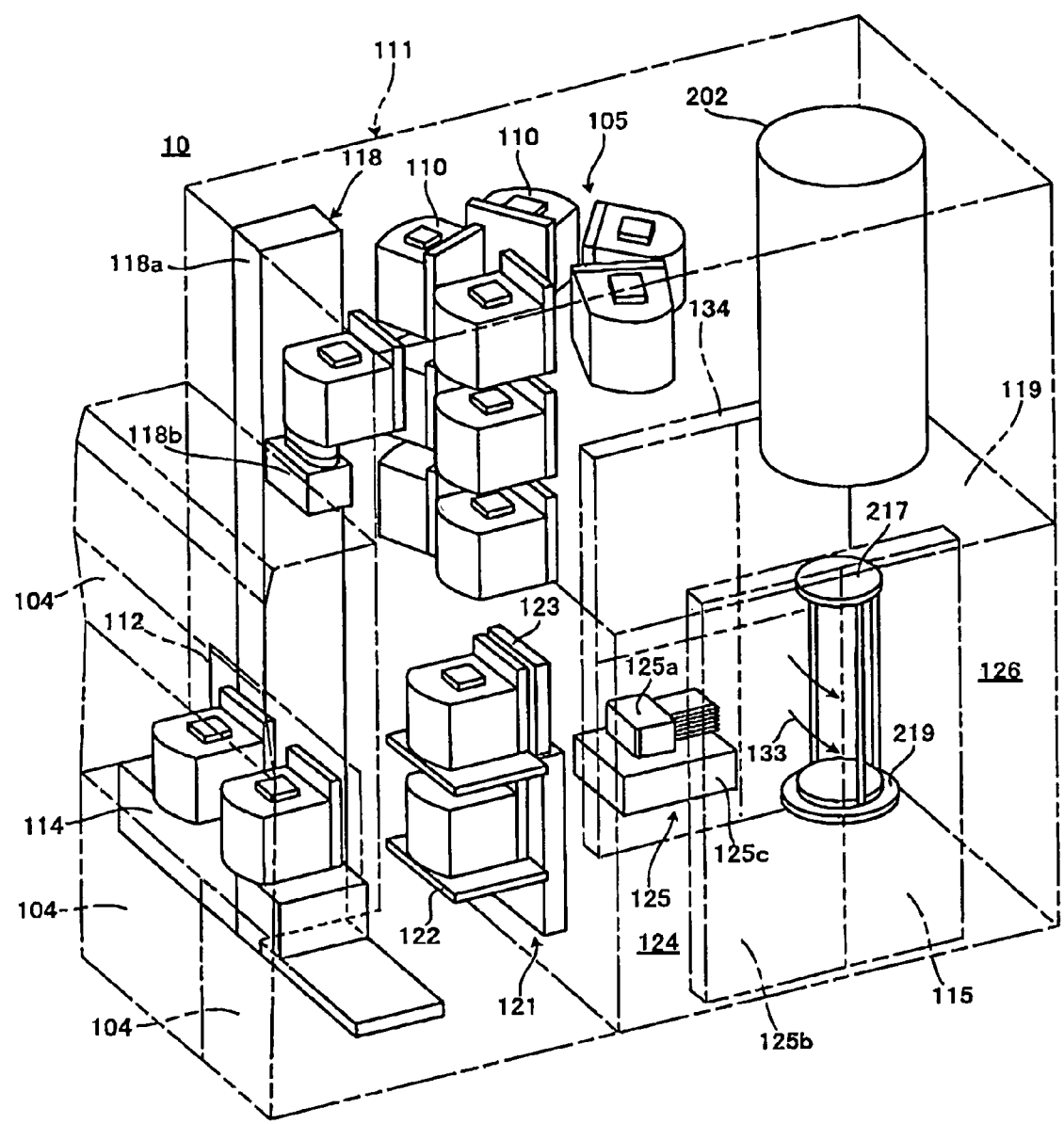
FIG. 2 is a perspective view of the substrate processing apparatus according to the embodiment of the present invention.

The substrate processing apparatus 10 is constructed as, for example, a semiconductor manufacturing apparatus performing the method of manufacturing a semiconductor device (IC). In the following will be described a case in which the substrate processing apparatus 10 is applied to a vertical apparatus (hereinafter simply referred to as "processing apparatus") for subjecting a substrate to an oxidation processing, a diffusion processing, and a CVD processing. FIG. 2 shows a perspective view of a substrate processing apparatus applied to the present invention. Further, FIG. 3 is a side view in perspective of the substrate processing apparatus shown in FIG. 2.

Figure 3:
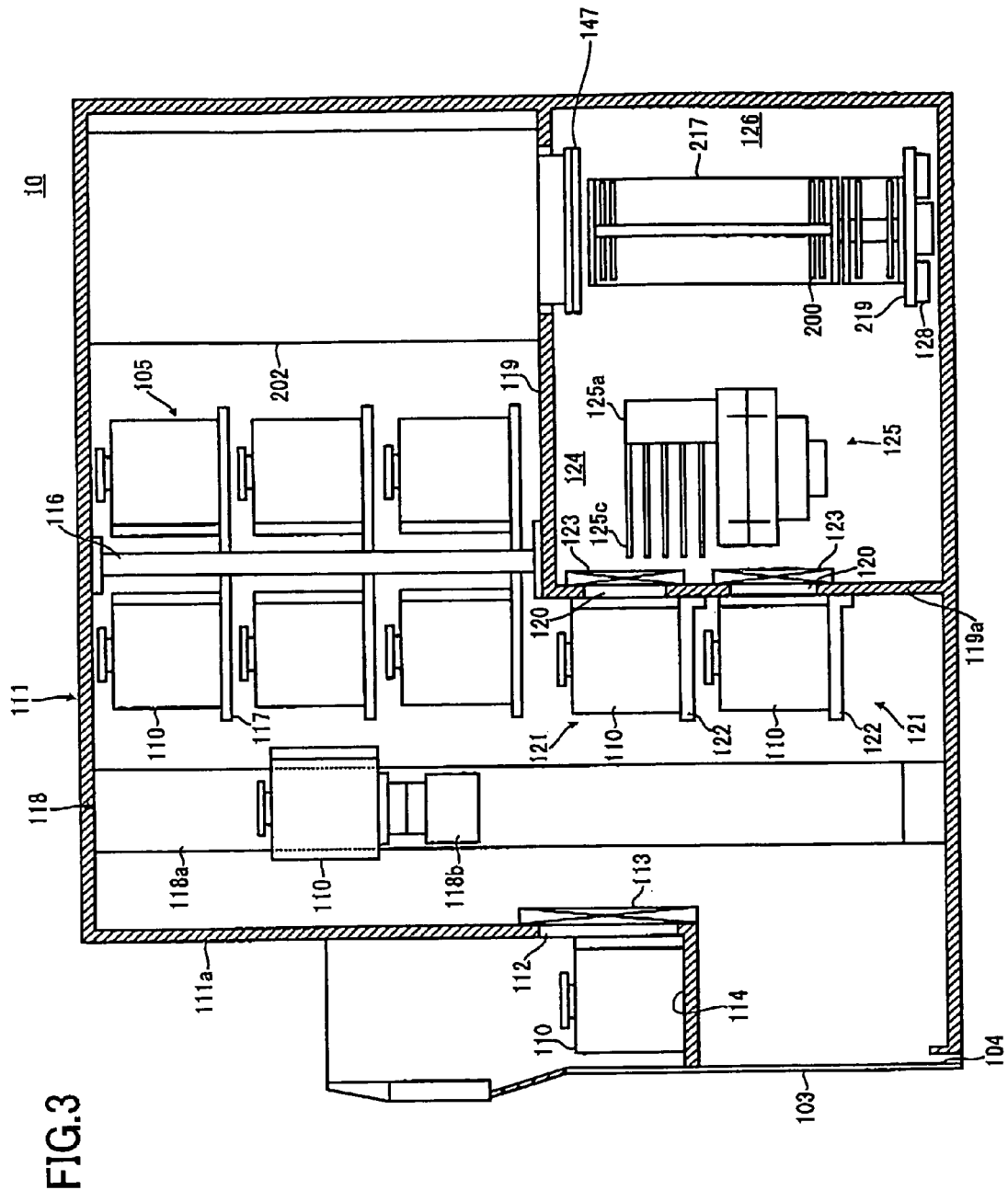
FIG. 3 is a side view in perspective of the substrate processing apparatus according to the embodiment of the present invention.

As shown in FIG. 2 and FIG. 3, the substrate processing apparatus 10 of the present invention, in which a hoop (substrate container, hereinafter referred to as "pod") 110 is used as a wafer carrier having wafers (substrates) 200 made of silicon or the like received therein, has a box 111. A front maintenance opening 103 as an opening through which a maintenance operation can be performed is formed in the front portion of the front wall 111a of the box 111. Front maintenance doors 104, 104 for opening/closing the front maintenance opening 103 are fixed to the front maintenance opening 103. An operating device 304 will be described later and hence its description will be omitted here.

A pod carrying-in/out opening (substrate container carrying-in/out opening) 112 is formed in the front wall 111a of the box 111 in such a way as to connect the inside and the outside of the box 111. The pod carrying-in/out opening 112 is opened or closed by a front shutter (mechanism for opening/closing the substrate container carrying-into/out opening) 113.

A load port (substrate container passing table) 114 is disposed on the front side of the pod carrying-in/out opening 112. The load port 114 is constructed so as to have a pod 110 placed thereon and to position the pod 110. The pod 110 is carried in and on the load port 114 and is carried out of the top of the load port 114 by an inter-process transfer unit (not shown).

A rotary pod shelf (substrate container supporting shelf) 105 is disposed in an upper portion nearly in a central portion in a front-back direction in the box 111. The rotary pod shelf 105 is constructed so as to store plural pods 110. In other words, the rotary pod shelf 105 has a column 116, which is vertically erected and is intermittently rotated in a horizontal plane, and plural shelf plates (stages having the substrate containers placed thereon) 117 which are supported radially at upper, middle, and lower positions by the column 116, and the plural shelf plates 117 are constructed in such a way that each shelf plate 117 has the plural pods 110 placed thereon.

A pod transfer unit (substrate container transfer unit) 118 is interposed between the load port 114 and the rotary pod shelf 105 in the box 111. The pod transfer unit 118 is constructed of a pod elevator (substrate container elevating mechanism) 118a capable of moving up and down with the pod 110 held thereon and a pod transfer mechanism (substrate container transfer mechanism) 118b as a transfer mechanism. The pod transfer unit 118 is constructed so as to transfer the pod 110 between the load port 114, the rotary pod shelf 105, and a pod opener (substrate container lid opening/closing mechanism) 121 by the continuous motions of the pod elevator 118a and the pod transfer mechanism 118b.

A sub-box 119 is formed to the rear end in the lower portion nearly in the central portion in the front-back direction in the box 111. A pair of wafer carrying-in/out openings (substrate carrying-in/out openings) 120 for carrying the wafer 200 into/out of the sub-box 119 are formed in the front wall 119a of the sub-box 119 in two upper/lower steps in the vertical direction. The wafer carrying-in/out openings 120, 120 formed in the upper and lower steps have a pair of pod openers 121, 121 fixed thereto, respectively. The pod openers 121, 121 have stages 122, 122 having the pods 110 placed thereon and cap mounting/dismounting mechanisms (lid mounting/dismounting mechanisms) 123, 123 for mounting/dismounting the caps of the pods 110, respectively. The pod opener 121 is constructed in such a way that the cap of the pod 110 placed on the stage 122 is mounted/dismounted by the cap mounting/dismounting mechanism 123 to thereby close/open the opening through which the pod 110 is carried in or out.

The sub-box 119 constructs a transfer chamber 124 fluidly isolated from a space in which the pod transfer unit 118 and the rotary pod shelf 105 are disposed. A wafer transfer mechanism (substrate transfer mechanism) 125 is disposed in the front region of the transfer chamber 124. The wafer transfer mechanism 125 is constructed of a wafer transfer unit (substrate transfer unit) 125a capable of rotating or directly moving the wafer 200 in the horizontal direction and a wafer transfer unit elevator (substrate transfer unit elevating mechanism) 125b for moving up/down the wafer transfer unit 125a. As schematically shown in FIG. 2, the wafer transfer unit elevator 125b is interposed between the right end portion of the pressure-resistant box 111 and a right end portion in the front region of the transfer chamber 124 of the sub-box 119. The wafer transfer mechanism 125 is constructed in such a way as to charge or discharge the wafer 200 into or from a boat (substrate holding jig) 217 by using the tweezers (substrate holding parts) 125c of the wafer transfer unit 125a as a stage on which the wafer 200 is placed by the successive actions of the wafer transfer unit elevator 125b and the wafer transfer unit 125a.

A standby portion 126 in which the boat 217 is received and is brought into a standby state is constructed in the rear region of the transfer chamber 124. A processing furnace 202 is disposed above the standby portion 126. The bottom portion of the processing furnace 202 is opened/closed by a furnace mouth shutter (furnace mouth opening/closing mechanism) 147.

As schematically shown in FIG. 2, a boat elevator (substrate holding jig elevating mechanism) 115 for moving up/down the boat 217 is interposed between the right end portion of the pressure-resistant box 111 and the right end portion of the standby portion 126 of the sub-box 119. An arm 128 as a connection jig connected to the elevating base of the boat elevator 115 has a seal cap 219 as a lid fixed horizontally thereto. The seal cap 219 is constructed so as to support the boat 217 vertically and to close the bottom portion of the processing furnace 202.

The boat 217 is constructed so as to have plural holding members and to hold plural wafers (for example, 50 to 125 wafers) 200 horizontally in a state where the wafers 200 are aligned in the vertical direction with their centers aligned.

As schematically shown in FIG. 2, a clean unit 134, which is constructed of a supply fan and a dust prevention filter so as to supply clean air 133 of cleaned atmosphere or inert gas, is disposed in the left end portion, which is opposite to the wafer transfer unit elevator 125b and the boat elevator 115, of the transfer chamber 124. Although not shown, a notch matching unit as a substrate matching unit for matching the wafers 200 in the circumferential direction is interposed between the wafer transfer unit 125a and the clean unit 134.

The clean air 133 blown off from the clean unit 134 is passed through the notch matching unit, the wafer transfer unit 125a, and the boat 217 in the standby portion 126, and then is sucked by a duct (not shown), and then is discharged to the outside of the box 111 or is circulated to a primary side (supply side) of the suction side of the clean unit 134 and again is blown into the transfer chamber 124 by the clean unit 134.

Next, the action of the substrate processing apparatus 10 of the present invention will be described.

As shown in FIG. 2 and FIG. 3, when the pod 110 is supplied to the load port 114, the pod carrying-in/out opening 112 is opened by the front shutter 113 and the pod 110 on the load port 114 is carried into the box 111 by the pod transfer unit 118 through the pod carrying-in/out opening 112.

The carried-in pod 110 is automatically transferred and passed to the specified shelf plate 117 of the rotary pod shelf 105 by the pod transfer unit 118 and is temporarily stored there. Then, the pod 110 is transferred and passed to one of the pod openers 121 from the shelf plate 117 and is temporarily stored there. Then, the pod 110 is transferred to one of the pod openers 121 from the shelf plate 117 and is transferred to the stage 122 or is transferred directly to the pod opener 121 and is transferred to the stage 122. At this time, the wafer carrying-in/out opening 120 of the pod opener 121 is closed by the cap mounting/dismounting mechanism 123 and the clean air 133 is flowed into the transfer chamber 124, whereby the transfer chamber 124 is filled with the clean air 133. For example, the transfer chamber 124 is filled with nitrogen gas as the clean air 133, whereby the transfer chamber 124 has an oxygen concentration set to 20 ppm or less which is far less than an oxygen concentration of the interior (atmosphere) of the box 111.

The pod 110 placed on the stage 122 has its opening-side end surface pressed onto the edge portion of the opening of the wafer carrying-in/out opening 120 formed in the front wall 119a of the sub-box 119 and has its cap dismounted by the cap mounting/dismounting mechanism 123 to open a wafer charging/discharging port.

When the pod 110 is opened by the pod opener 121, the wafers 200 are picked up from the pod 110 through the wafer charging/discharging port by the tweezers 125c of the wafer transfer unit 125a and then are aligned by the notch matching unit (not shown) 135 and then are carried into the standby portion 126 in the rear of the transfer chamber 124 and then are charged into the boat 217. The wafer transfer unit 125a passing the wafers 200 to the boat 217 returns to the pod 110 and charges the next wafers 110 into the boat 217.

While the wafers are charged into the boat 217 by the wafer transfer mechanism 125 in one pod (upper or lower) opener 121, the other pod 110 is transferred to the other (lower or upper) opener 121 from the rotary pod shelf 105 by the pod transfer unit 118, and the operation of opening the pod 110 by the pod opener 121 is performed at the same time.

A previously specified number of wafers 200 are charged into the boat 217, the bottom portion of the processing furnace 202 closed by the furnace mouth shutter 147 is opened by the furnace mouth shutter 147. Subsequently, the seal cap 219 is moved up by the boat elevator 115, thereby the boat 217 holding a group of wafers 200 is loaded into the processing furnace 202.

After the group of wafers 200 are loaded, the wafers 200 are subjected to an arbitrary processing in the processing furnace 202. After the wafers 200 are subjected to the processing, the wafers 200 and the pod 110 are delivered to the outside of the box by a procedure nearly opposite to the above-mentioned procedure except for the process of matching the wafers by the notch matching unit 135 (not shown).

Next, control means (main controller) for controlling the constituent elements of the substrate processing apparatus 10 will be described.

Figure 4:
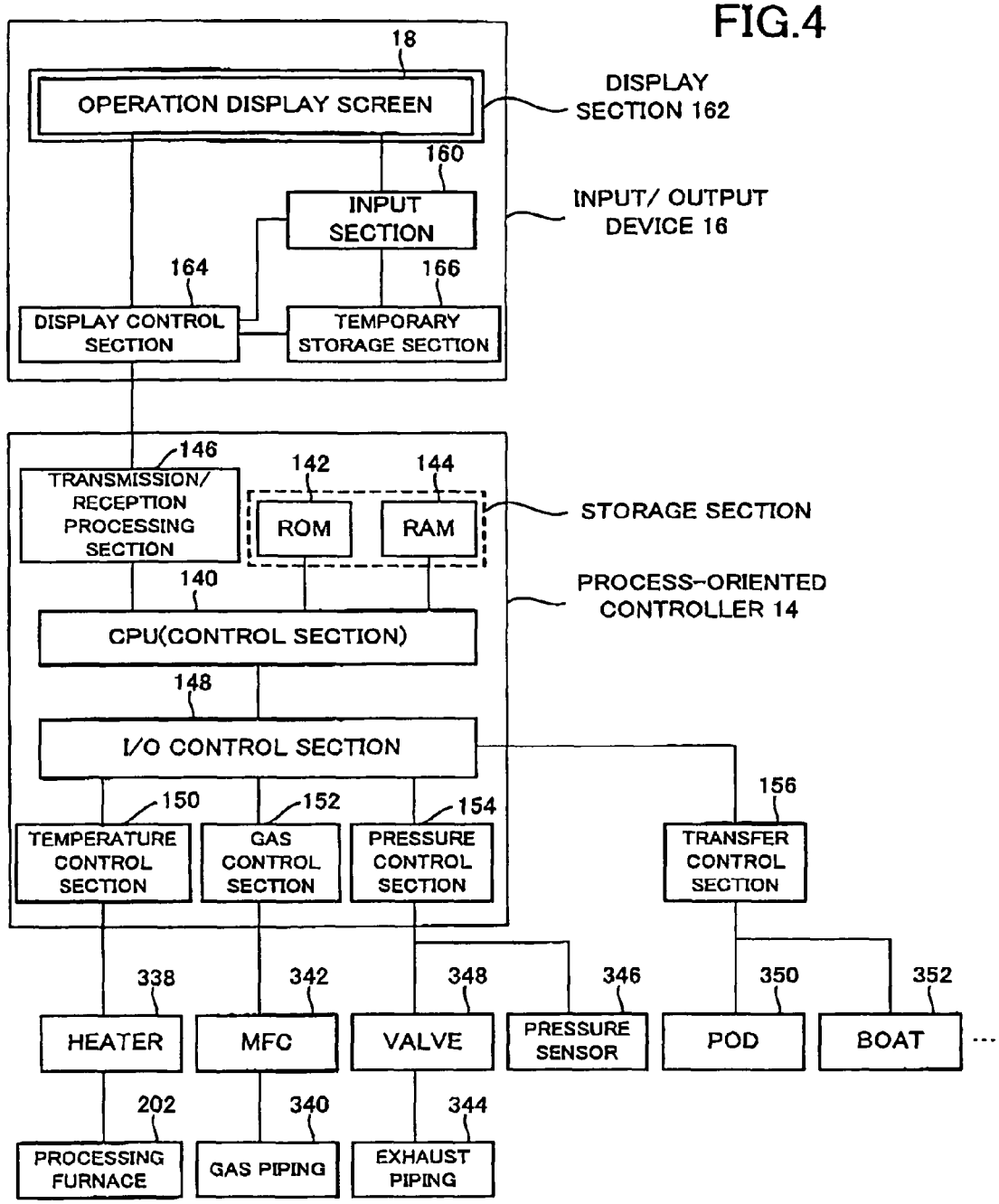
FIG. 4 is a diagram showing the configuration of hardware in which the control means of the substrate processing apparatus according to the embodiment of the present invention is a main unit.

FIG. 4 shows a hardware configuration having the control means (main controller) as a main unit. The main controller is constructed of the process-oriented controller 14 and the input/output device 16. The process-oriented controller 14 includes: a CPU 140 (a control section); a ROM (read-only memory) 142; a RAM (random-access memory) 144; a transmission/reception processing section 146 for transmitting/receiving data to/from the input/output device 16; a temperature control section 150; a gas control section 152; a pressure control section 154; a transfer control section 156; and an I/O control section 148 for controlling input/output to/from the temperature control section 150 and the like. The ROM 142 and the RAM 144 compose a storage section. The CPU 140 outputs control data (control instruction) for processing the substrate to the temperature control section 150, the gas control section 152, and the pressure control section 154 on the basis of the recipe produced or edited by the operation display screen 18 of the input/output device 16 and stored in the RAM 144 or the like. Here, the CPU 140 outputs a control instruction also to the transfer control section 156. Further, the CPU 140 receives data transmitted from these control sections.

In the ROM 142 or the RAM 144 are stored a sequence program, plural recipes, input data inputted from the input/output device 16, the command of the recipe, and the history data when the recipe is performed. In this regard, the process-oriented controller 14 may include a storage (not shown) realized by a hard disc drive (HDD) or the like, and in this case the storage stores the same data as is stored in the RAM 144. In this manner, the ROM 142 or the RAM 144 is used as means for storing the recipe describing the procedure of processing the substrate. An input instruction (input data) means an instruction provided by the operation display screen 18 of the input/output device 16. The input instruction (input data) includes, for example, an instruction to perform the recipe and an instruction to set the operating authority of the user, but is not limited to these.

The input/output device 16 includes; an input section 160 for receiving an input instruction of the user (operator) from the operation display screen 18; a display section 162 for displaying data and the like stored in the RAM 144 and the like; a temporary storage section 166 for storing the input instruction received by the input section 160 until the input instruction is transmitted to the transmission/reception processing section 146 by the display control section 164 which will be described later; and the display control section 164 for receiving an input instruction from the input section 160 and for transmitting the input instruction to the display section 162 or the transmission/reception processing section 146. As will be described later, the display control section 164 receives an instruction (control instruction) for making the CPU 140 perform an arbitrary recipe of plural recipes stored in the ROM 142 or the RAM 144 via the transmission/reception processing section 146. The display section 162 displays an arbitrary recipe instructed by the instruction provided by the display control section 164 on the operation display screen 18. Further, the display section 162, as will be described later, displays an authority setting screen for setting the operating authority of the user (operator), an edition screen for editing a recipe, and the like on the operation display screen 18.

The temperature control section 150 controls temperature in the processing furnace 202 by a heater 338 disposed on the outer peripheral portion of the processing furnace 202. The gas control section 152 controls the quantity of supply of reactive gas to be supplied into the processing furnace 202 on the basis of the output value of a MFC (mass flow controller) 342 disposed in gas piping 340 of the processing furnace 202. The pressure control section 154 controls pressure in the processing furnace 202 by opening/closing a valve 348 on the basis of the output value of a pressure sensor 346 disposed in exhaust piping 344 of the processing furnace 202. In this manner, the sub-controllers such as the temperature control section 150 control various parts (the heater 338, the MFC 342, and the valve 348) on the basis of control instructions from the CPU 140.

For example, when data for setting a recipe or data of the operating authority of the user (operator) to the recipe (input data) is inputted by the input section 160 via the operation display screen 18 of the input/output device 16, the input data (input instruction) is stored in the storage section 166 and is displayed on the display section 162 via the display control section 164 and is further transmitted to the transmission/reception processing section 146 of the process-oriented controller 14 by the display control section 164. The CPU 140 stores the input data in the RAM 144 and determines setting and inputting, for example, a recipe stored in the ROM 142 and the operating authority of the user (operator) to the recipe. The CPU 140 invokes a sequence program to call up, for example, a command of a recipe stored in the RAM 144 according to the sequence program, thereby sequentially executing the steps, whereby control instructions for processing the substrate are transmitted to the temperature control section 150, the gas control section 152, the pressure control section 154, and the transfer control section 156 via the I/O control section 148. The controllers of the temperature control section 150 and the like control the respective parts (the heater 338, the MFC 342, and the valve 348) in the substrate processing apparatus 10 according to the control instructions from the CPU 140. In this manner, the wafers 200 are processed.

In the substrate processing apparatus in this embodiment, the operating authority of the user (operator) is set for each kind of the file. Further, the operating authority of a group registering plural users is set for each kind of the file. For example, speaking of a process recipe of various recipes, when the operating authority of a specified group to the process recipe is set in such a way that the specified group is allowed to edit the process recipe, each user registered in the group can refer to and edit the file of the process recipe. Here, the operating authority is set by a specified operator such as a manager (also referred to as "master user").

Preferably, the operating authority of each user is set in correspondence to the operating condition of the substrate processing apparatus 10. That is, when the operating condition of the substrate processing apparatus 10 is offline, a person taking charge of a line is allowed to edit a recipe, and when the operating condition of the substrate processing apparatus 10 is online, the substrate processing apparatus 10 is operated by an instruction from a host computer and hence the contents of a recipe needs to be not changed. Thus, the person taking charge of a line is prohibited from editing the recipe. When the operating condition of the substrate processing apparatus 10 is online and a trouble occurs, it is preferable, for example, to allow a maintenance engineer to edit a recipe.

Next, the method for setting the operating authority of the user (operator) to each recipe stored in the substrate processing apparatus 10 will be described on the basis of FIG. 5 to FIG. 8.

Figure 5:
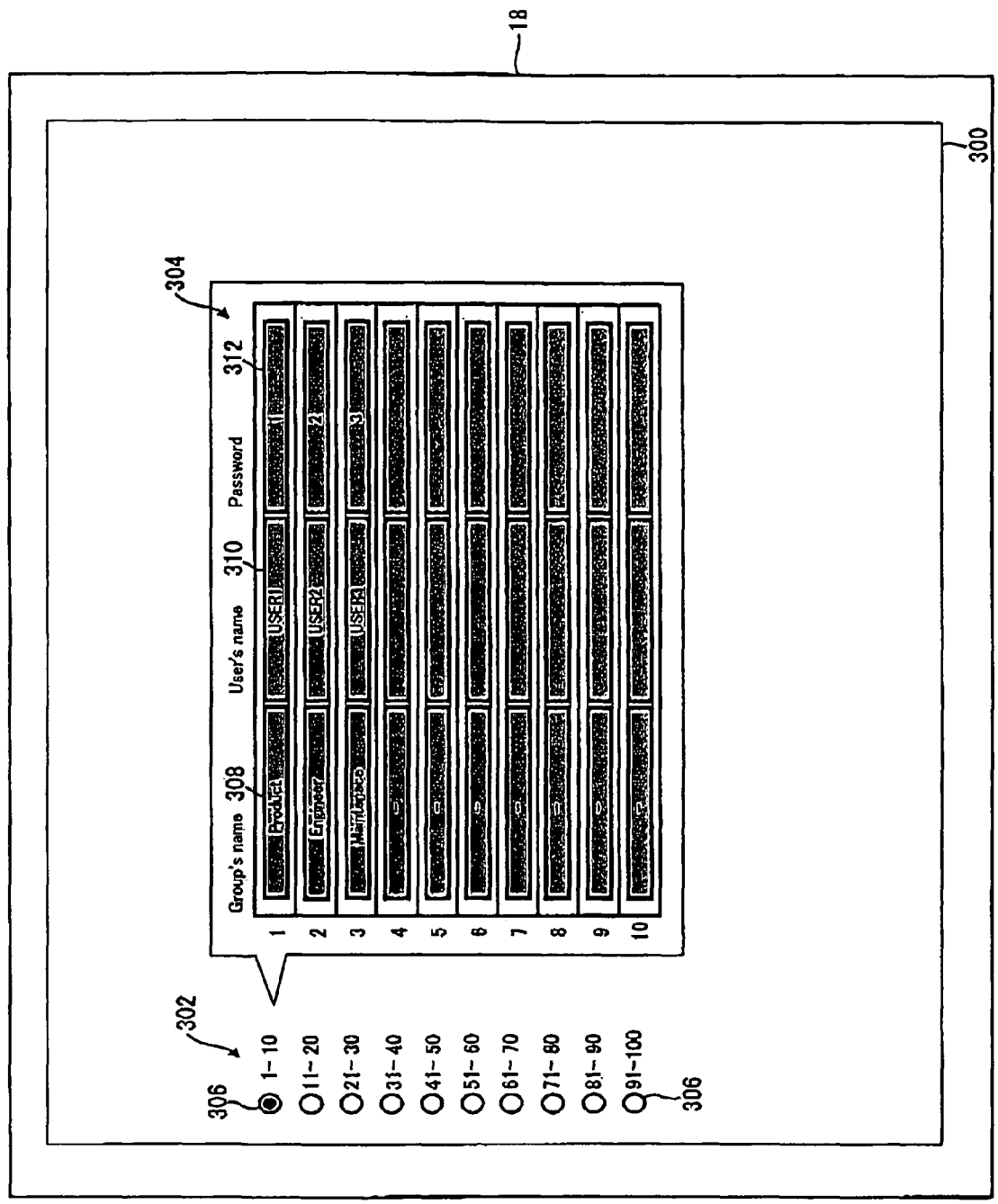
FIG. 5 is a diagram showing a user setting screen displayed as an operation display screen on an input/output device of the substrate processing apparatus.

FIG. 5 is a diagram showing a user setting screen 300 displayed as the operation display screen 18 on the input/output device 16 of the substrate processing apparatus 10 and operated, for example, by a manager. User's name, the name of a group to which each user belongs, and a password corresponding to each user are displayed on the user setting screen 300 and various items can be edited (updated, corrected, and inputted).

As shown in FIG. 5, the user setting screen 300 includes a table selection display section 302 and a user setting table 304. The table selection display section 302 has plural selection parts 306, and when any one of the selection parts 306 is selected (pressed down), a specified number of user setting tables 304 corresponding to the selection part 306 are displayed.

The user setting table 304 includes: a group's name setting part 308 for editing the attribute of a user, which is referred to as a "group's name"; a user's name setting part 310 for editing a user's name; and a password setting part 312 for inputting a password corresponding to each user's name. As the group's name is inputted or selected the name of group to which each user belongs, for example, "product", "engineer", "maintenance", or "recovery". For example, "product" includes a user of a person taking charge of a line; "engineer" includes a user of a process engineer; and "maintenance" includes a user of a maintenance engineer. Here, the number of the group's names is not limited to a specified number and the designation of the group's name is arbitrarily set as required. For example, the names of an on-line engineer and a maintenance engineer may be set as the group's name. The user's name expresses the name of a user and the password is a character string of alphanumeric characters. As shown in FIG. 5, for example, the manager inputs "user 1" to the user's name setting part 310 and inputs "product" to the group's name setting part 308 and inputs "1" to the password setting part 312.

Figure 6:
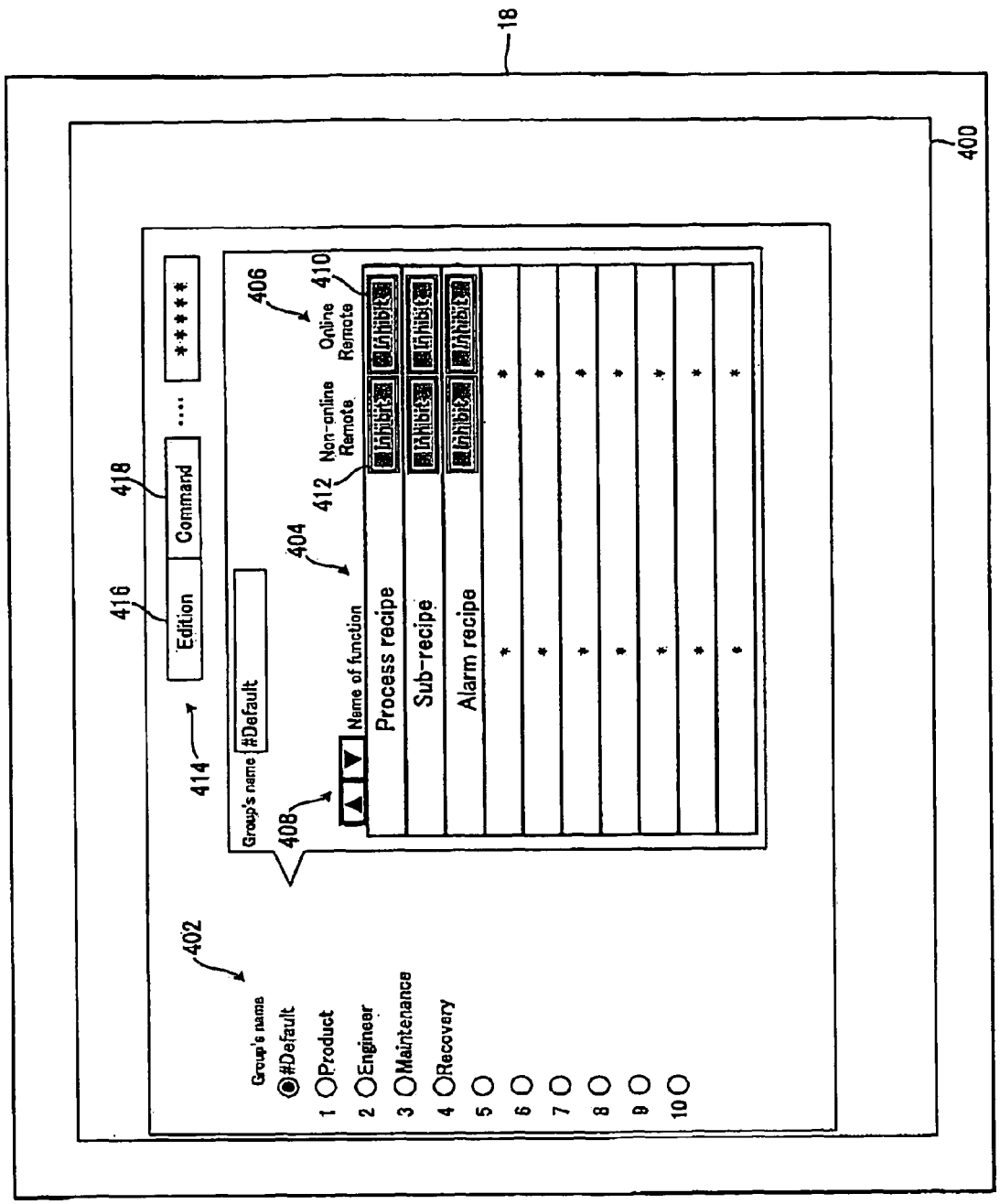
FIG. 6 is a diagram showing an authority setting screen displayed as an operation display screen on the input/output device of the substrate processing apparatus.

FIG. 6 is a diagram showing an authority setting screen 400 displayed as the operation display screen 18 on the input/output device 16 of the substrate processing apparatus 10 and operated, for example, by the manager. On this authority setting screen 400, the operating authority of the user (group) corresponding to each recipe is set.

As shown in FIG. 6, the authority setting screen 400 includes: a group selection section 402 for selecting an object group's name; a file list display section 404 for displaying plural recipes and like; and an authority input section 406 for inputting the operating authority of a group corresponding to each of the plural recipes. The group selection section 402 displays plural group's names set by the user setting table 304 and an object group's name can be selected.

The file list display section 404 displays a list of plural recipes stored as files in the substrate processing apparatus 10. Here, the file list display section 404 may display not only the recipes but also files for performing specified processings. For example, the file list display section 404 displays a process recipe, a sub-recipe, and an alarm recipe. Here, the file list display section 404 has a display switching button 408 and when a list of recipes cannot be displayed on one screen, the list of recipes can be switched for display or can be scrolled for display as required by the use of the display switching button 408.

The authority setting section 406 includes an online authority setting part 410 and an offline authority setting part 412. To the online authority setting part 410 is inputted (selected) the operating authority of a group (user) corresponding to each recipe when the operating condition of the substrate processing apparatus 10 is online (online remote: condition in which the substrate processing apparatus 10 to be processed is operated by an instruction from a control device such as the host device 20). To the off line authority setting part 412 is inputted (selected) the operating authority of a group (user) corresponding to each recipe when the operating condition of the substrate processing apparatus 10 is offline (non-online remote). The operating authority of the group (user) is set for each recipe and is any one of, for example, "inhibit", "read only", "edit", and "execute".

Here, "inhibit" is an authority to inhibit editing and reading a file such as a recipe, "read only" is an authority to inhibit editing a file such as a recipe and to allow reading the file, "edit" is an authority to allow editing and reading a file such as a recipe, and "execute" is an authority to allow executing (starting) a recipe and the like.

Further, the authority setting screen 400 includes a group of buttons 414 formed of plural buttons. An edition button 416, a command button 418, and the like are arranged in the group of buttons 414. Here, FIG. 6 is a diagram when the edition button 416 is pressed down. When the command button 418 is pressed down, although not shown, plural files stored as commands are displayed in the file list display section 404. The command button can be also set on the authority setting screen 400.

Figure 7:
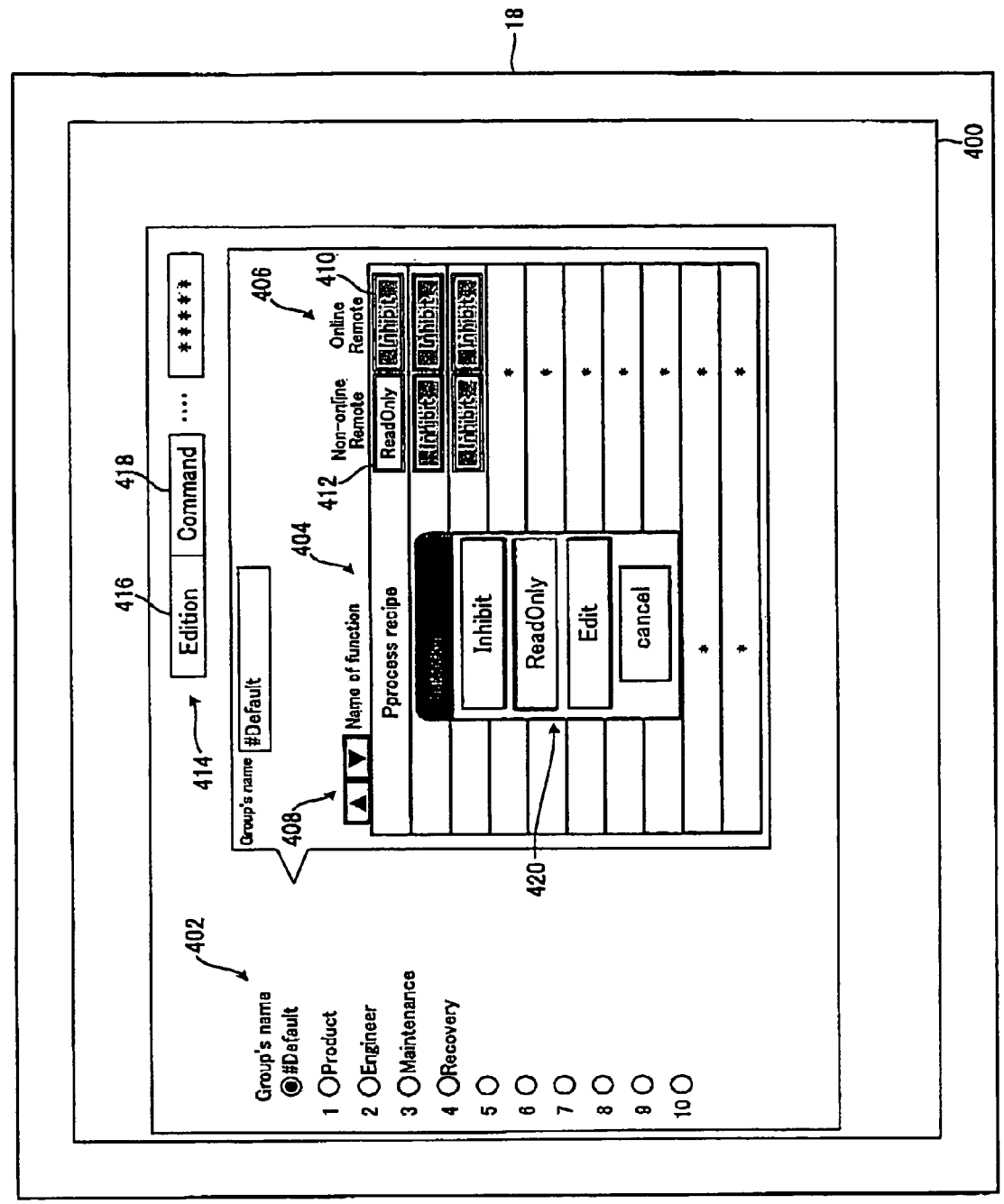
FIG. 7 is a diagram for showing the setting of the authority of a specified recipe on the authority setting screen via a selection screen.

As shown in FIG. 7, when the edition button 416 is selected and further, for example, the online authority input part 410 or the offline authority input part 412 corresponding to a specified recipe is selected on the authority setting screen 400, a selection screen 420 is displayed. On the selection screen 420, any one of "inhibit", "read only", "edit", and "cancel" can be selected.

For example, on the authority setting screen 400, the manager selects "default" in the group's name selection section 402 and selects the edition button 416 and selects the offline authority input part 412 corresponding to a process recipe. Then, on the selection screen 420, the manager selects "read only". With this, the manager can set an allowance to read the process recipe on the substrate processing apparatus 10 side at the time of the offline operating condition to a user belonging to the group of "default".

Further, on the authority setting screen 400, the manager selects, for example, "engineer" or "maintenance" in the group's name selection section 402 and selects "edit" to the online authority setting part 410 corresponding to a specified recipe via the selection screen 420. With this, the manager can set an allowance to read and edit the specified recipe on the substrate processing apparatus 10 side at the time of the online operating condition to the user belonging to the group of "engineer" or "maintenance".

Still further, on the authority setting screen 400, the manger selects, for example, "product" in the group's name section 402 and selects "read only" or "inhibit" to the online authority setting part 410 corresponding to a specified recipe via the selection screen 420. With this, the manager can set an inhibition to edit the specified recipe on the substrate processing apparatus 10 side at the time of the online operating condition to the user belonging to "product".

Figure 8:
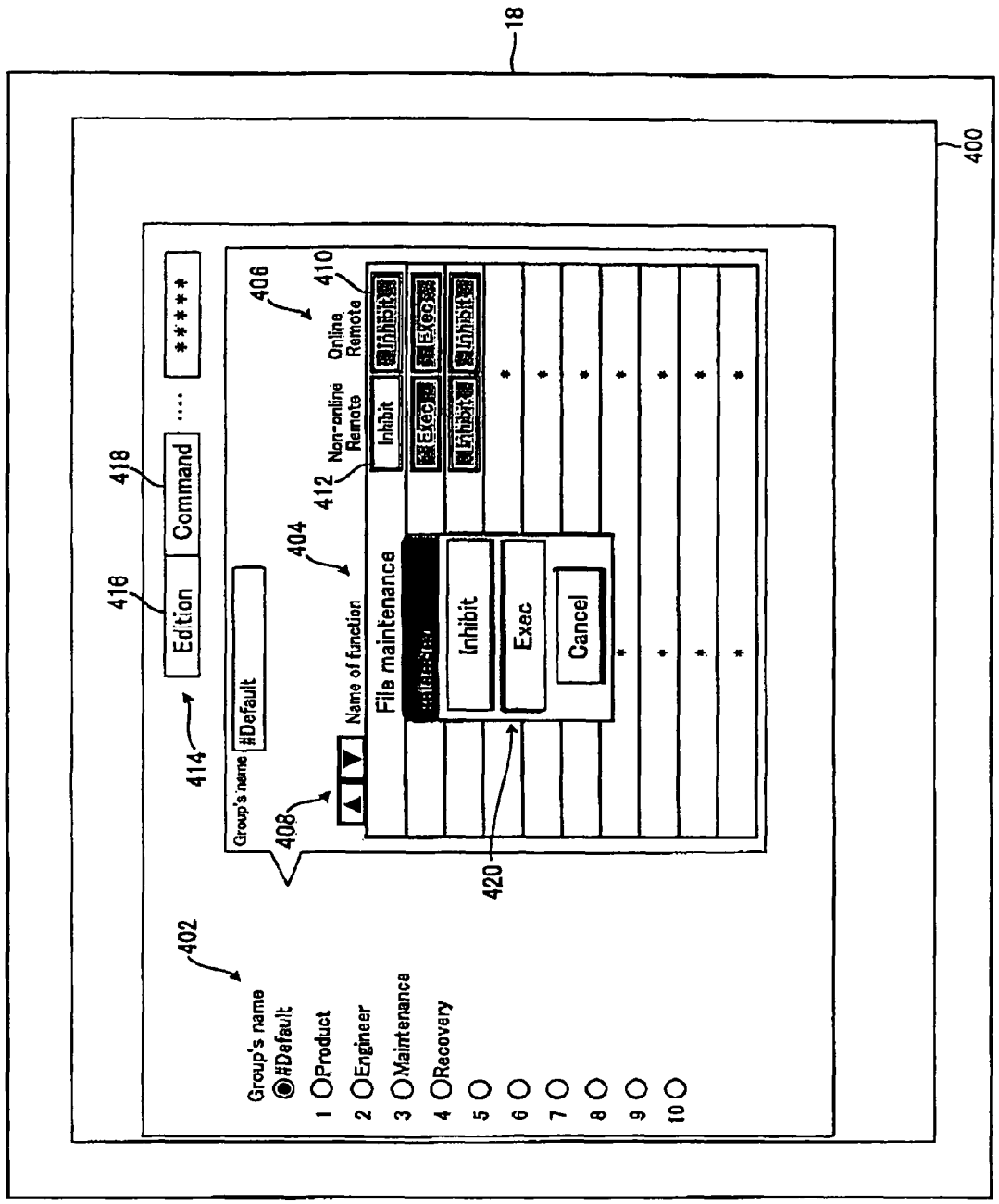
FIG. 8 is a diagram for showing the setting of the authority of a specified command on the authority setting screen via the selection screen.

As shown in FIG. 8, when the command button 418 is selected and the online authority setting part 410 or the offline authority setting part 412 corresponding to a displayed specified command is selected on the authority setting screen 400, the selection screen 420 is displayed. On the selection screen 420, anyone of, for example, "inhibit", "execute", and "cancel" can be selected. Here, when the online authority setting part 410 is selected and a transfer command of specified commands is set to "inhibit", it is possible to inhibit displaying the transfer command button to the user belonging to the group of "product" (or to inhibit the user belonging to the group of "product" from operating the transfer command button). With this, it is possible to inhibit the user belonging to the group of "product" from inserting the pod 110 at the time of the online operating condition.

For example, the manager selects "default" in the group's name selection section 402 and selects the command button 418 and selects the offline authority setting part 412 corresponding to the command of file maintenance on the authority setting screen 400, and selects "execute" on the selection screen 420. With this, the manager can set an allowance to execute maintenance on the substrate processing apparatus 10 side at the time of the offline operating condition to the user belonging to the group of "default". In this case, a command button for executing file maintenance is displayed on the screen.

Here, the file maintenance is the function of executing the maintenance work of the file handled by this apparatus such as the copying of the file between the hard disc and external storage media such as a floppy disc and the backing-up of the file set in the system.

As described above, the authority setting screen 400 is used as a setting screen for setting the operating authority of the user (operator) to a specified recipe stored in the ROM 142 or the RAM 144.

Figure 9:
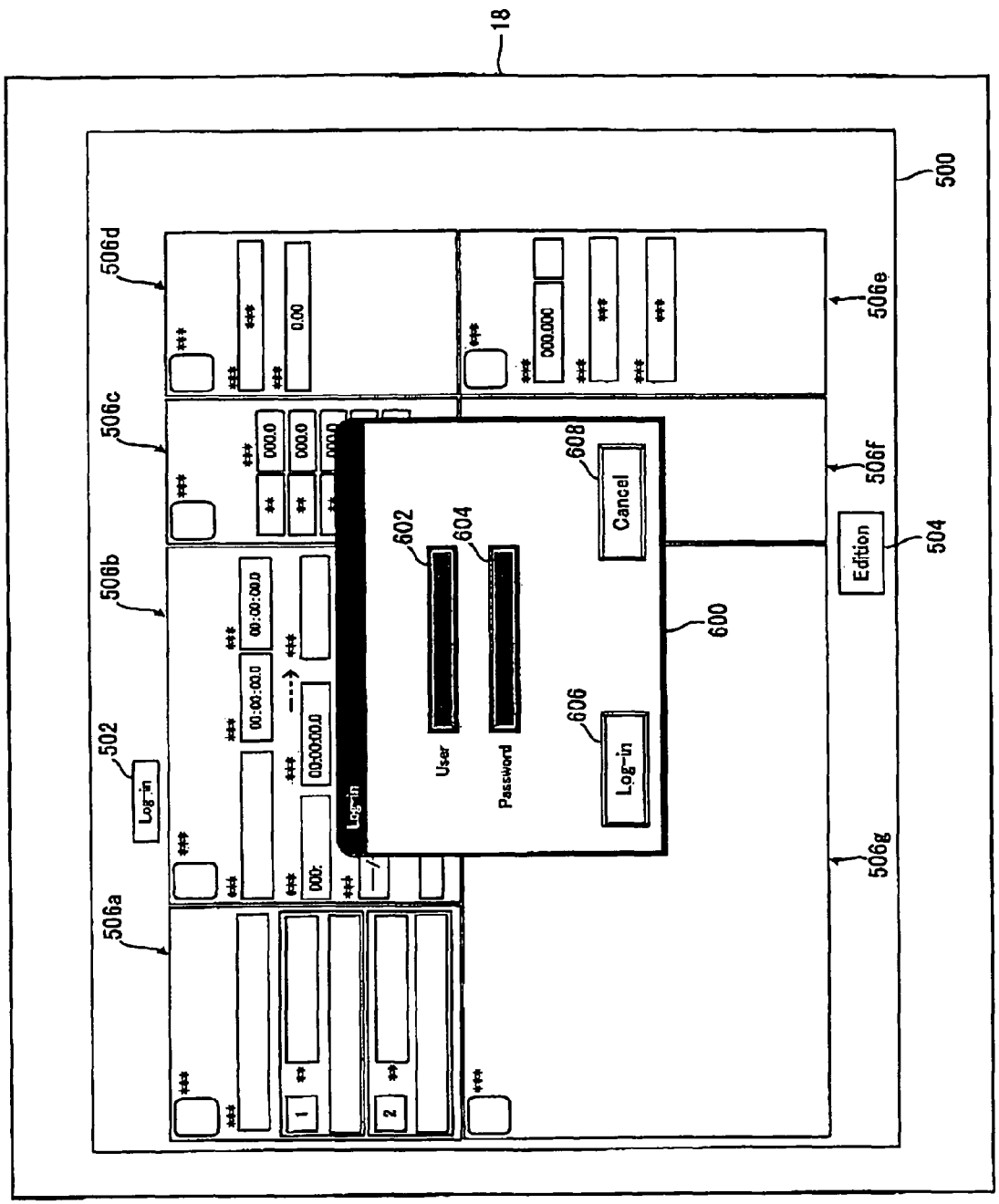
FIG. 9 is a diagram showing a log-in screen displayed as an operation display screen on the input/output device of the substrate processing apparatus.

FIG. 9 is a diagram to show a main screen 500, which is displayed as the operation display screen 18 on the input/output device 16 of the substrate processing apparatus 10 and is operated by, for example, the user (operator).

As shown in FIG. 9, the main screen 500 includes a log-in button 502, an edition button 504, and condition display parts 506a to 506g for displaying recipes and various conditions (for example, a temperature condition, and a pressure condition) for processing the substrate.

The log-in screen 600 is displayed on the main screen 500 when the log-in button 502 is selected (pressed down). The log-in screen 600 includes a user's name input part 602 for inputting user's name, a password input part 604 for inputting a password corresponding to the user's name, a log-in button 606 for executing log-in, and a cancel button 608 for canceling log-in. When the user inputs user's name to the user's name input part 602 and inputs a password to the password input part 604 and presses down the log-in button 606 on the log-in screen 600, the user can execute log-in.

When the user selects the edition button 504 after executing log-in, an edition menu screen 700 which will be described later is displayed. Thus, the user is not required to input the user's name and the password every time the user edits (or reads) a specified recipe. This can reduce the operating time spent when the user edits (or reads) the recipe.

Figure 10:
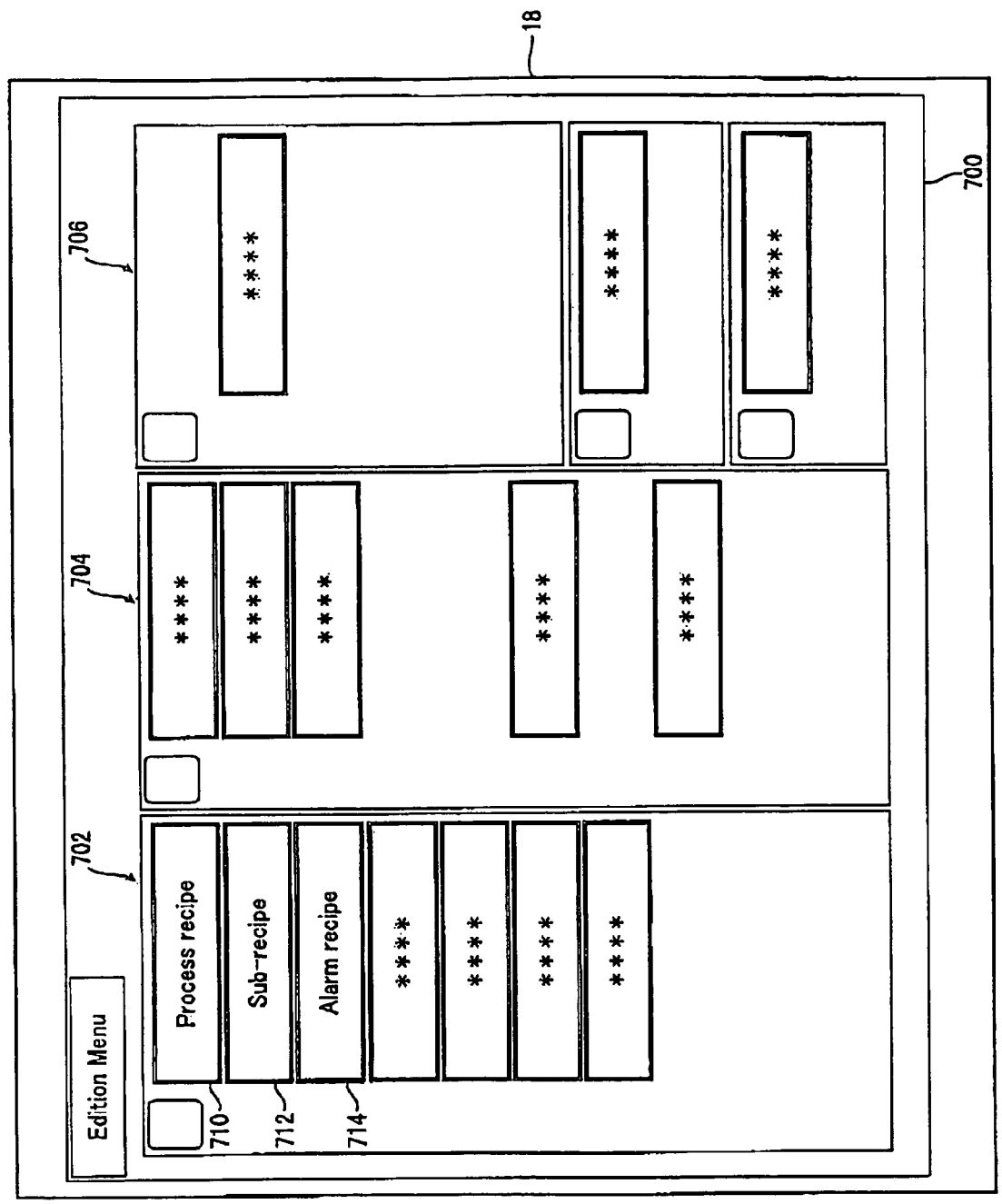
FIG. 10 is a diagram showing an edition menu screen displayed as an operation display screen on the input/output device of the substrate processing apparatus.

FIG. 10 is a diagram to show the edition menu screen 700, which is displayed as the operation display screen 18 on the input/output device 16 of the substrate processing apparatus 10 and is operated by, for example, the user (operator). The edition menu screen 700 is displayed when the edition button 504 is selected on the main screen 500.

The edition menu screen 700 includes, for example, a recipe selection section 702, a temperature setting selection section 704, and a pressure setting selection section 706. In the recipe selection section 702 are displayed, for example, a process recipe selection button 710, a sub-recipe selection part 712, and an alarm recipe selection part 714. The process recipe selection button 710, the sub-recipe selection part 712, and the alarm recipe selection part 714 are displayed when "read only", "edit", and "execute" are selected in the authority input section 406 of the authority setting screen 400. That is, of the plural recipes stored in the ROM 142 or the RAM 144, a recipe for which "inhibit" is selected in the authority input section 406 is not displayed on the edition menu screen 700.

When the process recipe selection button 710 is pressed down (selected) on the edition menu screen 700, a recipe edition menu screen (not shown) is displayed.

On the recipe edition menu screen are displayed, for example, a process recipe button, a variable parameter button, and a recipe data range check parameter button.

When the process recipe button is selected on the recipe edition menu screen 700, a process recipe list display screen (not shown) is displayed.

The process recipe list display screen displays a list of plural recipes relating to the process recipe and displays the attribute of the recipe such as the file name (recipe name) corresponding to each recipe, the date and time of edition, an editor, and comments. For example, a file AAA edited by an editor ABC and a file BBB edited by an editor EFG are displayed on the process recipe list display screen. When the file name displayed on the process recipe list display screen is selected, a recipe edition screen 900 (to be described later by the use of FIG. 11) corresponding to the file is displayed.

Figure 11:
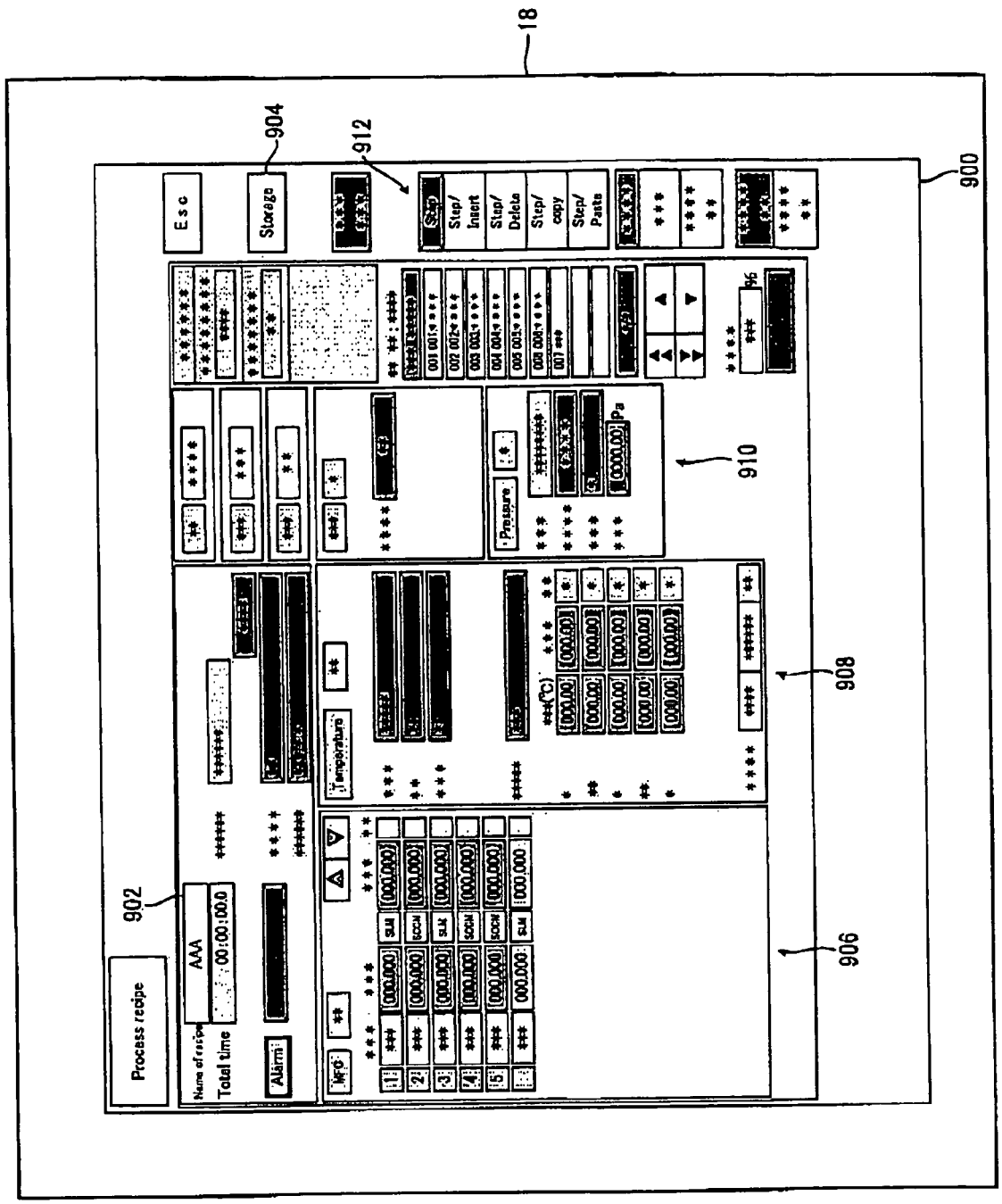
FIG. 11 is a diagram showing a recipe edition screen displayed as an operation display screen on the input/output device of the substrate processing apparatus.

FIG. 11 is a diagram to show the recipe edition screen 900, which is displayed as the operation display screen 18 on the input/output device 16 of the substrate processing apparatus 10 and is operated by, for example, the user (operator). The recipe edition screen 900 is displayed when a specified file name (recipe name) displayed on the process recipe list display screen is selected. The detailed contents of the specified recipe are displayed on the recipe edition screen 900 and the instruction of editing (updating) a specified recipe can be inputted to the recipe edition screen 900. This drawing shows a state in which a recipe name AAA is selected in the process recipe list display screen.

As shown in FIG. 11, the recipe edition screen 900 includes: a recipe name display part 902; a storage button 904; and plural input parts for editing the recipe and various conditions for processing the substrate, for example, a flow condition input part 906 for setting the flow rate of reactive gas or the like; a temperature condition input part 908 for setting a furnace temperature and the like, a pressure condition input part 910 for setting a furnace pressure and the like, and a step input part 912 for setting each step of the recipe. When the user inputs respective conditions in the recipe (for example, recipe AAA) and commands displayed on the recipe name display part 902 to the respective input parts on the recipe edition screen 900 and presses down the storage button 904, the user updates the recipe.

As described above, the recipe edition screen 900 is used as an edition screen for editing a recipe stored in the ROM 142 or the RAM 144 on the basis of the operating authority set via the authority setting screen 400. Further, the input/output device 16 is used as display means for displaying the authority setting screen 400 and the recipe edition screen 900, and an operating authority can be set via the authority setting screen 400 displayed by the input/output device 16 in the respective cases where the operating condition of the substrate processing apparatus 10 is online and where the operating condition of the substrate processing apparatus 10 is offline. Thus, items to be edited on the recipe edition screen 900 are different between when the operating condition of the substrate processing apparatus 10 is online and when the operating condition of the substrate processing apparatus 10 is offline. Further, on the recipe edition screen 900, a distinction whether or not the names of items (MFC, temperature, pressure, and the like) are displayed is made by the operating authority set to the user editing the recipe AAA, and it is preferable that the item to which the user is not given an operating authority is not displayed on the recipe edition screen 900.

Figure 12:
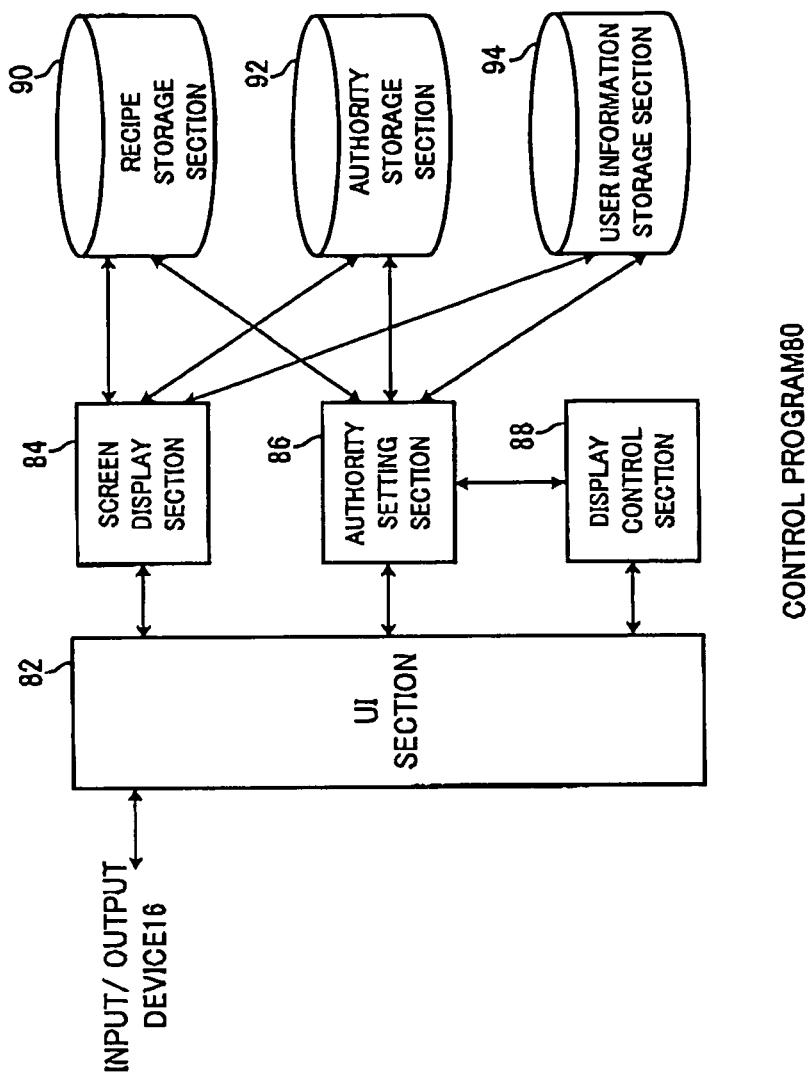
FIG. 12 is a block diagram showing the configuration of a control program executed on a process-oriented controller of the substrate processing apparatus.

Next, a control program 80 for realizing the method of controlling the substrate processing apparatus 10 according to this embodiment of the present invention will be described. FIG. 12 is a diagram showing the configuration of the control program 80 executed on the process-oriented controller 14 of the substrate processing apparatus 10.

As shown in FIG. 12, the control program 80 includes: a user interface (UI) section 82; a screen display section 84; an authority setting section 86; a display control section 88; a recipe storage section 90; an authority storage section 92; and a user information storage section 94. The control program 80 is supplied to the process-oriented controller 14, for example, from the host device 20 through the network and is loaded to the RAM 144 and is executed on an OS (not shown) by the CPU 140. Here, the control program 80 may be supplied to the process-oriented controller 14 via a storage medium such as an FD, a CD, or a DVD, or may be inputted to the process-oriented controller 14 via the input/output device 16.

In the control program 80, the recipe storage section 90 is realized as a file and stores plural recipes describing the procedure of processing the substrate. The recipe storage section 90 is realized by at least any one of the RAM 144 and an HDD (not shown).

The user information storage section 94 stores user's information (user's name, group's name to which the user belongs, and user's password). This user information storage section 94 is realized in the same way as the recipe storage section 90.

The authority storage section 92 stores the operating authority of each user to each recipe stored in the recipe storage section 90. Describing more specifically, the authority storage section 92 stores the operating authority of each user to each recipe in the case where the operating condition of the substrate processing apparatus 10 is online and in the case where the operating condition of the substrate processing apparatus 10 is offline. This authority storage section 92 is realized in the same way as the recipe storage section 90.

The screen display section 84 makes the input/output device 16 display the user setting screen 300 (FIG. 5) on the operation display screen 18. The screen display section 84 receives data inputted via the user setting screen 300, in other words, user's information (user's name, group's name to which the user belongs, and user's password) and outputs the user's information to the user information storage section 94. Further, the screen display section 84 makes the input/output device 16 display the authority setting screen 400 (FIG. 6) on the operation display screen 18. The screen display section 84 receives data inputted via the authority setting screen 400, in other words, the operating authority of each user to each recipe and outputs the operating authority to the authority storage section 86. Still further, the screen display section 84 displays the operating authority set by the authority setting section 86, which will be described later, on the authority setting screen 400.

The display control section 88 makes the input/output device 16 display the log-in screen 600 (FIG. 9) on the operation display screen 18. The display control section 88 receives data inputted via the log-in screen 600, in other words, user's information (user's name and password corresponding to the user) and outputs the user's information to the authority setting section 92.

The authority setting section 92 compares user's information outputted by the display control section 88 with user's information stored in the user information storage section 94 to determine whether or not the inputted user's name exists in the user information storage section 94 and whether or not the inputted password is correct. Further, the authority setting section 86 outputs the determination result as user check information to the display control section 88.

Further, the authority setting section 86 sets the operating authority of the user on the basis of the recipe stored in the recipe storage section 90, the operating authority information of the user (group to which the use belongs) stored in the authority storage section 92 and the operating condition of the substrate processing apparatus 10. Describing more specifically, the authority setting section 92 sets the operating authority of the user on the basis of the operating authority information inputted via the authority setting screen 400 displayed by the screen display section 84 and the operating condition (which is online or offline) of the substrate processing apparatus 10 and outputs the operating authority as the authority setting information to the display control section 88. In other words, when the operating condition of the substrate processing apparatus 10 is online or when the operating condition of the substrate processing apparatus 10 is offline, the authority setting section 86 can set the operating authority when the operating condition of the substrate processing apparatus 10 is online or the operating authority when the operating condition of the substrate processing apparatus 10 is offline via the authority setting screen 400 displayed by the screen display section 84. In this manner, the authority setting section 86 constructs operating authority setting means for setting the operating authority of the user (operator) to the recipe.

Further, when the display control section 88 receives authority setting information outputted by the authority setting section 86, the display control section 88 controls the display of the recipe edition screen 900 (FIG. 12) on the operation display screen 18 by the input/output device 16 on the basis of the authority setting information. In other words, on the basis of the operating authority set via the authority setting screen 400 displayed by the authority setting section 86 and the operating condition (which is online or offline) of the substrate processing apparatus 10, the display control section 88 determines whether or not the detailed display of a specified recipe stored in the recipe storage section 90 or the edition of the recipe is allowed.

Still further, the display control section 88 controls the display of the recipe edition screen 900 on the basis of user check information outputted by the authority setting section 86. Describing specifically, when the user's name and password inputted to the log-in screen 600 do not coincide with user's information stored in the user information storage section 94, the display control section 88 inhibits the input/output device 16 from displaying the recipe edition screen 900 on the operation display screen 18. In this manner, the display control section 88 constructs display means for displaying the recipe edition screen 900 for editing a recipe stored in the recipe storage section 90 on the basis of the operating authority set via the authority setting screen 400 displayed by the screen display section 84.

The UI section 82 receives the operation of the user to the input/output device 16 and outputs the operation to the respective constituent sections of the control program 80. Further, the UI section 82 outputs information and data made by the respective constituent sections of the control program 80 and the processing contents of respective constituent sections to the input/output device 16.

Next, the control processing of the substrate processing apparatus 10 according to the embodiment of the present invention will be described.

Figure 13:
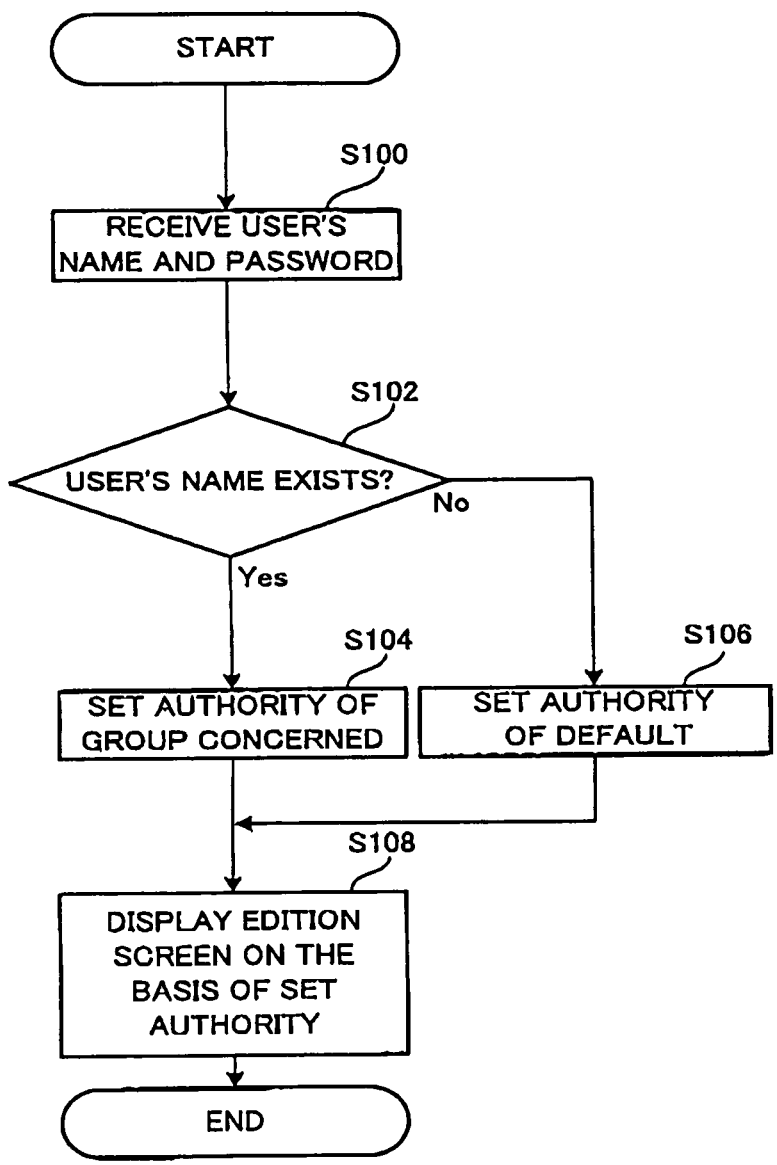
FIG. 13 is a flow chart showing a display control processing based on an operating authority by the substrate processing apparatus according to the embodiment of the present invention.

FIG. 13 is a flow chart showing a display control processing S10 based on the operating authority of the user (operator) in the substrate processing apparatus 10 according to the embodiment of the present invention.

As shown in FIG. 13, in step 100 (S100), the display control section 88 of the control program 80 executed on the process-oriented controller 14 makes the input/output device 16 display the log-in screen 600 on the operation display screen 18. The display control section 88 receives data inputted via the log-in screen 600, in other words, user's name and the password corresponding to the user's name.

In step 102 (S102), the authority setting section 86 determines whether or not the inputted user's name exists. Describing specifically, the authority setting section 86 determines whether or not the user's name inputted via the log-in screen 600 is identical with the user's name stored in the user information storage section 94. When the authority setting section 86 determines that they are identical with each other, the processing proceeds to the step 104 (S104). When the authority setting section 86 determines that they are not identical with each other, the processing proceeds to the step 106 (S106).

In step 104 (S104), the authority setting section 86 sets an operating authority corresponding to the inputted user's name. Describing specifically, the authority setting section 86 sets the operating authority of the user (group to which the user belongs) stored in the authority storage section 92 to the user's name inputted to the log-in screen 600. Describing more specifically, the authority setting section 86 sets the operating authority of the user to each recipe according to the operating condition (which is online or offline) of the substrate processing apparatus 10 to the user's name inputted to the log-in screen 600.

In step 106 (S106), the authority setting section 86 sets the operating authority to the inputted user's name to "inhibit". Describing more specifically, the authority setting section 86, as shown in FIG. 6, sets the group to which the inputted user's name belongs to "default" and sets the operating authorities to all recipes to "inhibit".

In step 108 (S106), the display control section 88 controls the display of the recipe edition screen 900 on the basis of the operating authority set by the authority setting section 86. Describing more specifically, on the basis of such the operating authority of the user (group) to each recipe that is set by the authority setting section 86 and on the basis of the operating condition (which is online or offline) of the substrate processing apparatus 10, the display control section 88 determines whether or not the recipe edition screen 900 is displayed or whether or not the edition of the displayed recipe is allowed. For example, if the operating authority of the group to which the inputted user's name belongs is set to "inhibit" to a process recipe when the operating condition of the substrate processing apparatus 10 is online and is set to "edit" to the process recipe when the operating condition of the substrate processing apparatus 10 is offline, only when the operating condition of the substrate processing apparatus 10 is off line, the display control section 88 makes the input/output device 16 display the recipe edition screen 900 on the operation display screen 18, thereby allowing the user to edit (update) the process recipe.

In this embodiment, "default" is prepared and even if the inputted user's name is not registered, the log-in processing can be performed. However, "default" is not necessarily prepared and it is acceptable to employ the mode in which when the user's name is not registered, the log-in processing is not allowed.

A specific example will be described. For example, on the authority setting screen 400 for a specified command shown in FIG. 8, by setting the authority of the file maintenance to "inhibit" when the operating condition of the substrate processing apparatus 10 is online and by setting the authority to "execute" when the operating condition of the substrate processing apparatus 10 is offline, it is possible to prevent the file maintenance processing, which is absolutely not related to the processing of the substrate, from being performed in the process of the substrate processing apparatus 10 being automatically operated when the operating condition of the substrate processing apparatus 10 is online. In other words, this can prevent an extra load from being put on the main controller.

For example, it is assumed that a user A is a person taking charge of a line (an online person) and a user B is a process engineer (offline person). On the authority setting screen 400 for a specified command shown in FIG. 8, the user A has authorities of a transfer command and a PM command set to "inhibit" respectively when the operating condition of the substrate processing apparatus 10 is online and when the operating condition of the substrate processing apparatus 10 is offline. On the other hand, the user B has the authorities set to "inhibit" when the operating condition of the substrate processing apparatus 10 is online because the substrate processing apparatus 10 is automatically operated a process recipe specified by the host device is executed, but has the authorities set to "execute" when the operating condition of the substrate processing apparatus 10 is offline. Next, on the authority setting screen 400 for a specified recipe shown in FIG. 6, the user A has the authority of a process recipe set to "inhibit" or "read only" when the operating condition of the substrate processing apparatus 10 is online and when the operating condition of the substrate processing apparatus 10 is offline. On the other hand, the user B has the authority set to "inhibit" or "read only" when the operating condition of the substrate processing apparatus 10 is online because the substrate processing apparatus 10 is automatically operated, but has the authority set to "edit" when the operating condition of the substrate processing apparatus 10 is offline. When the authorities for the user A and the user B are set in this manner, manual processing (for example, the processing of transferring the substrate and the processing of performing the recipe) can be performed when the operating condition of the substrate processing apparatus 10 is offline. In particular, a person not having an authority is inhibited from performing the test operation of the process when the substrate processing apparatus 10 is set up, which can assure that the test operation is performed safely. Further, this can prevent the trouble that when the operating condition of the substrate processing apparatus 10 is online, even though a process recipe specified by the host device 20 is down-loaded, the process recipe is edited and down-loaded on the operation display screen 18 to cause an error.

For example, when a user A is a person in charge of a line (online person) and a user B is a maintenance engineer (offline person), on the authority setting screen 400 for the specified command shown in FIG. 8, the user A has the authority of the transfer command set to "inhibit" when the substrate processing apparatus 10 is online and when the substrate processing apparatus 10 is offline. On the other hand, the user B has the authority of the transfer command set to "inhibit" when the substrate processing apparatus 10 is online because the substrate processing apparatus 10 is automatically operated, but has the authority of the transfer command set to "execute" when the substrate processing apparatus 10 is offline. By setting the authorities in this manner, the user B can manually and safely perform the operations of, for example, replacing the boat and the reactive pipe to be washed at the time of maintenance and teaching the transfer unit. Further, the user B can manually and safely perform the recovery operation of, for example, recovering a broken substrate when a trouble occurs.

As described above, according to the present invention, the operating authority of the user (operator) can be set via the operation display screen 18 of the input/output device 16 when the operating condition of the substrate processing apparatus 10 is online or when the operating condition of the substrate processing apparatus 10 is off line. With this, even when the operating condition of the substrate processing apparatus 10 is online and a trouble occurs, it is possible to allow a specified user, for example, a user belonging to the group of maintenance or engineer (maintenance engineer or process engineer) to edit or start a recipe (usually, the user is not allowed to edit or start the recipe). Thus, when a trouble occurs, the user can quickly respond to the trouble on the substrate processing apparatus 10 side, which in turn can shorten the time required to solve the trouble and hence can realize an improvement in the productivity of the substrate processing apparatus 10. On the other hand, it is also possible to inhibit the user belonging to the product (person in charge of line) from editing or starting a recipe when the operating condition of the substrate processing apparatus 10 is online, which in turn can prevent the occurrence of trouble caused by an operating error or the like.

The present invention can be applied as the substrate processing apparatus not only to the semiconductor manufacturing apparatus but also to an apparatus for processing a glass substrate such as an LCD apparatus. The processing of forming a film includes, for example, the processing of forming CVD, PVD, an oxide film, and a nitride film, and the processing of forming a film containing metal. Further, while the vertical processing apparatus has been described in this embodiment, the present invention can be applied in the same manner also to a single wafer processing apparatus. Still further, the present invention can be applied also to a system or a control apparatus in which plural substrate processing apparatuses are combined with a device for controlling the respective substrate processing apparatuses.

INDUSTRIAL AVAILABILITY

The present invention can be used for an apparatus required to shorten the time spent when a trouble occurs in the substrate processing apparatus for processing a semiconductor wafer and a glass substrate.

The present invention includes the following embodiments in addition to the apparatuses as claimed in claims:
(1) a substrate processing system including: storage means for storing various files including a plurality of recipes describing a procedure for processing a substrate and operating authorities of a user corresponding to the plurality of recipes; and display means for displaying an authority setting screen for setting the operating authorities of the user to the respective recipes and an edition screen for editing a recipe stored in the storage means respectively when an operating condition of the substrate processing apparatus is online or when an operating condition of the substrate processing apparatus is offline;

(2) the substrate processing system as described in (1), wherein a recipe (process recipe) for manufacturing a product substrate of the plurality of recipes is set in such a way that the recipe cannot be edited when the operating condition of the substrate processing apparatus is online;

(3) a substrate processing system including: storage means for storing a command for performing a specified function in the substrate processing apparatus and an operating authority of the user corresponding to the command; and display means for displaying an authority setting screen for setting the operating authority of the user to the command and a function screen for performing a command stored in the storage means on the basis of the operating authority set via the authority setting screen respectively when an operating condition of the substrate processing apparatus is online or when an operating condition of the substrate processing apparatus is offline;

(4) the substrate processing system as described in (3), wherein the command is set in such a way as that the command cannot be executed when the operating condition of the substrate processing apparatus is online;

(5) the substrate processing system as described in any one of (1) to (4), including a group parameter for previously setting a group to which the user belongs according to a user's ID and a user's password, wherein the operating authority of the user can be set for each group;

(6) the substrate processing system as described in (1) or (2), wherein the respective recipes are set different between when the operating condition of the substrate processing apparatus is online and when the operating condition of the substrate processing apparatus is offline; and (7) the substrate processing system as described in (3) or (4), wherein the command is set different between when the operating condition of the substrate processing apparatus is online and when the operating condition of the substrate processing apparatus is offline.

What is claimed is:

1. A substrate processing apparatus comprising:
   a storage section for storing various files including a plurality of recipes describing a procedure for processing a substrate and operating authorities of a user corresponding to the plurality of recipes and the user's information for previously setting a group to which the user belongs according to an ID of the user and a password of the user; and
   a display section for displaying an authority setting screen for setting the operating authorities of the user to the respective recipes and an edition screen for editing the recipes stored in the storage section, wherein
   the authority setting screen includes a group selection section for selecting an object group's name, a file list display section for displaying plural recipes, and an authority input section for inputting the operating authority of a group corresponding to each of the plural recipes,
   the display section displays the authority setting screen so that the operating authorities of the user are set different respectively by the user's information when an operating condition of the substrate processing apparatus is online or when an operating condition of the substrate processing apparatus is offline, and
   the edition screen is not displayed, such that a recipe for processing the substrate of the plurality of recipes cannot be edited when the operating condition of the substrate processing apparatus is online even if the user has the operating authorities to edit the recipe on the edition screen.

2. The substrate processing apparatus as claimed in claim 1, comprising a control device configured to control the substrate processing apparatus,
   wherein the control device is configured to: i) control display of the authority setting screen so that the operating authorities of the user are set different respectively when an operating condition of the substrate processing apparatus is online or when an operating condition of the substrate processing apparatus is offline, and ii) not display the edition screen, such that a recipe for processing the substrate of the plurality of recipes cannot be edited when the operating condition of the substrate processing apparatus is online even if the user has the operating authorities to edit the recipe on the edition screen.

3. The substrate processing apparatus as claimed in claim 1, wherein the user includes: i) an engineer operating the substrate processing apparatus, ii) a maintenance engineer performing processing according to the contents of a trouble when the trouble occurs, and iii) a process engineer performing process test at a time of a set-up.

4. The substrate processing apparatus as claimed in claim 1, wherein
   the authority setting screen displays at least one of a process recipe, a sub-recipe, and an alarm recipe as plural recipes, and
   the operating authority of the user can be set for each file.

5. The substrate processing apparatus as claimed in claim 4, wherein the authority input section includes: i) an online authority setting part for selecting the operation authority of a user corresponding to each recipe when the operating condition of the substrate processing apparatus is online, and ii) an offline authority setting part for selecting the operation authority of a user corresponding to each recipe when the operating condition of the substrate processing apparatus is offline.

6. The substrate processing apparatus as claimed in claim 1, wherein the operating authorities of the user include: i) an authority to inhibit editing and reading of a file such as a recipe, ii) an authority to inhibit editing of a file such as a recipe and to allow reading the file, iii) an authority to allow editing and reading of a file such as a recipe, and iv) an authority to allow executing of a recipe.

7. The substrate processing apparatus as claimed in claim 1, wherein the display section displays a user setting screen for displaying: i) a user's name, ii) a name of the group to which each user belongs, and iii) the password corresponding to each user, and the user setting screen includes: i) a group's name setting part for editing an attribute of a user, ii) a user's name setting part for editing the user's name, and iii) a password setting part for inputting the password corresponding to each user's name.

8. A substrate processing apparatus comprising:
   a storage section for storing a command for performing a specified function in the substrate processing apparatus and an operating authority of a user corresponding to the command and the user's information for previously setting a group to which the user belongs according to an ID of the user and a password of the user; and
   a display section for displaying an authority setting screen for setting the operating authority of the user corresponding to the command and a function screen for performing a command stored in the storage section on the basis of the operating authority set via the authority setting screen, wherein the authority setting screen includes a group selection section for selecting an object group's name, a file list display section for displaying plural recipes, and an authority input section for muffing the operating authority of a group corresponding to each of the plural recipes, the display section displays the authority setting screen so that the operating authorities of the user are set different respectively by the user's information when an operating condition of the substrate processing apparatus is online or when an operating condition of the substrate processing apparatus is offline, and the function screen is not displayed, such that the command cannot be executed when the operating condition of the substrate processing apparatus is online even if the user has the operating authorities to perform the command on the function screen.

9. The substrate processing apparatus as claimed in claim 8, comprising a control device configured to control the substrate processing apparatus, wherein the control device is configured to: i) control display of the authority setting screen so that the operating authorities of the user are set different respectively when an operating condition of the substrate processing apparatus is online or when an operating condition of the substrate processing apparatus is offline, and ii) not display the function screen, such that the command cannot be executed when the operating condition of the substrate processing apparatus is online even if the user has the operating authorities to perform the command on the function screen.

10. The substrate processing apparatus as claimed in claim 8, wherein the user includes: i) an engineer operating the substrate processing apparatus, ii) a maintenance engineer performing processing according to the contents of a trouble when the trouble occurs, and iii) a process engineer performing process test at a time of a set-up.

11. The substrate processing apparatus as claimed in claim 8, wherein the authority setting screen displays files for performing specified processing, and the operating authority of the user can be set for each file.

12. The substrate processing apparatus as claimed in claim 11, wherein the authority input section includes: i) an online authority setting part for selecting the operation authority of a user corresponding to each recipe when the operating condition of the substrate processing apparatus is online, and ii) an offline authority setting part for selecting the operation authority of a user corresponding to each recipe when the operating condition of the substrate processing apparatus is offline.

13. The substrate processing apparatus as claimed in claim 8, wherein the operating authorities of the user include: i) an authority to inhibit editing and reading of a file such as a recipe, ii) an authority to inhibit editing of a file such as a recipe and to allow reading the file, iii) an authority to allow editing and reading of a file such as a recipe, and iv) authority to allow executing of a recipe.

14. The substrate processing apparatus as claimed in claim 8, wherein the display section displays a user setting screen for displaying: i) a user's name, ii) a name of the group to which each user belongs, and iii) the password corresponding to each user, and the user setting screen includes: i) a group's name setting part for editing an attribute of a user, ii) a user's name setting part for editing the user's name, and iii) a password setting part for inputting the password corresponding to each user's name.

15. A non-transitory computer-readable medium storing a control program which, when executed by a hardware processor, causes a computer to function as a device comprising:

means for storing various files including a plurality of recipes describing a procedure for processing a substrate and operating authorities of a user corresponding to the plurality of recipes and the user's information, for previously setting a group to which the user belongs according to an ID of the user and a password of the user; and means for displaying an authority setting screen for setting the operating authorities of the user to the respective recipes and an edition screen for editing the recipes stored in a storage section, wherein the authority setting screen includes a group selection section for selecting an object group's name, a file list display section for displaying plural recipes, and an authority input section for inputting the operating authority of a group corresponding to each of the plural recipes, the authority setting screen is displayed so that the operating authorities of the user are set different respectively by the user's information when an operating condition of the substrate processing apparatus is online or when an operating condition of the substrate processing apparatus is offline, and the edition screen is not displayed, such that a recipe for processing the substrate of the plurality of recipes cannot be edited when the operating condition of the substrate processing apparatus is online even if the user has the operating authorities to edit the recipe on the edition screen.

16. A non-transitory computer-readable medium storing a control program which, when executed by a hardware processor, causes a computer to function as a device comprising:

means for storing a command for performing a specified function in the substrate processing apparatus and an operating authority of a user corresponding to the command and the user's information for previously setting a group to which the user belongs according to an ID of the user and a password of the user; and means for displaying an authority setting screen for setting the operating authority of the user corresponding to the command and a function screen for performing a command stored in a storage section on the basis of the operating authority set via the authority setting screen, wherein the authority setting screen includes a group selection section for selecting an object group's name, a file list display section for displaying plural recipes, and an authority input section for inputting the operating authority of a group corresponding to each of the plural recipes, the authority setting screen is displayed so that the operating authorities of the user are set different respectively by the user's information when an operating condition of the substrate processing apparatus is online or when an operating condition of the substrate processing apparatus is offline, and the function screen is not displayed, such that the command cannot be executed when the operating condition of the substrate processing apparatus is online even if the user has the operating authorities to perform the command on the function screen.

* * * * *